US007354344B2

(12) United States Patent
Paulsen et al.

(10) Patent No.: US 7,354,344 B2
(45) Date of Patent: Apr. 8, 2008

(54) GAMING DEVICE HAVING A PLURALITY OF INTERACTIVE PLAYER-SELECTABLE SYMBOLS

(75) Inventors: Craig A. Paulsen, Reno, NV (US); Binh T. Nguyen, Reno, NV (US)

(73) Assignee: IGT, Reno, NV (US)

(*) Notice: Subject to any disclaimer, the term of this patent is extended or adjusted under 35 U.S.C. 154(b) by 757 days.

(21) Appl. No.: 10/448,983

(22) Filed: May 31, 2003

(65) Prior Publication Data

US 2004/0242315 A1 Dec. 2, 2004

(51) Int. Cl.

*A63F 9/24* (2006.01)
*A63F 13/00* (2006.01)
*G06F 17/00* (2006.01)
*G06F 19/00* (2006.01)

(52) U.S. Cl. ........................... 463/20; 463/16; 463/25; 463/29

(58) Field of Classification Search ............ 463/19–13, 463/16–31, 46

See application file for complete search history.

(56) References Cited

U.S. PATENT DOCUMENTS 1,527,929 A 2/1925 Simons
3,533,629 A 10/1970 Raven
4,560,161 A 12/1985 Hamano
4,582,324 A 4/1986 Koza et al.
4,695,053 A * 9/1987 Vazquez et al. .............. 463/18
4,743,022 A 5/1988 Wood
4,926,327 A 5/1990 Sidley
5,019,973 A 5/1991 Wilcox et al.
5,154,429 A 10/1992 LeVasseur
5,188,363 A 2/1993 Marnell, II et al.
5,251,897 A 10/1993 Fulton
5,255,915 A 10/1993 Miller
5,288,081 A 2/1994 Breeding
5,294,120 A 3/1994 Schultz
5,322,295 A 6/1994 Cabot et al.
5,332,228 A 7/1994 Schultz
5,393,057 A * 2/1995 Marnell, II .................. 463/13
5,417,430 A 5/1995 Breeding
5,431,408 A 7/1995 Adams
5,437,451 A 8/1995 Fulton (Continued)

FOREIGN PATENT DOCUMENTS

EP 0688002 A1 12/1995

(Continued)

OTHER PUBLICATIONS

American Thunder Advertisement, written by IGT, published in 1998.

(Continued)

*Primary Examiner*—Robert E. Pezzuto
*Assistant Examiner*—Binh-An D. Nguyen
(74) *Attorney, Agent, or Firm*—Bell, Boyd & Lloyd LLP

(57) ABSTRACT

A gaming device which includes a plurality of interactive player-selectable symbols which is offered to a player during a game played upon the gaming device. The player may select one or more of the player-selectable symbols to be added to one or more plurality of symbols which were initially provided to the player.

21 Claims, 24 Drawing Sheets

U.S. PATENT DOCUMENTS

| | | | | |
|---|---|---|---|---|
| 5,531,448 | A | 7/1996 | Moody | |
| 5,636,842 | A | 6/1997 | Cabot et al. | |
| 5,732,950 | A | 3/1998 | Moody | |
| 5,769,716 | A | 6/1998 | Saffari et al. | |
| 5,816,916 | A | 10/1998 | Moody | |
| 5,823,873 | A | 10/1998 | Moody | |
| 5,833,536 | A | 11/1998 | Davids et al. | |
| 5,882,261 | A * | 3/1999 | Adams | 463/20 |
| 5,911,418 | A * | 6/1999 | Adams | 273/274 |
| 5,947,820 | A * | 9/1999 | Morro et al. | 463/9 |
| 5,954,335 | A | 9/1999 | Moody | |
| 5,980,384 | A | 11/1999 | Barrie | |
| 6,015,346 | A * | 1/2000 | Bennett | 463/20 |
| 6,045,129 | A | 4/2000 | Cooper et al. | |
| 6,068,552 | A * | 5/2000 | Walker et al. | 463/21 |
| 6,102,798 | A | 8/2000 | Bennett | |
| 6,120,031 | A | 9/2000 | Adams | |
| 6,126,542 | A | 10/2000 | Fier | |
| 6,129,357 | A | 10/2000 | Wichinsky | |
| 6,129,632 | A | 10/2000 | Luciano | |
| 6,131,908 | A | 10/2000 | Palmer | |
| 6,132,311 | A | 10/2000 | Williams | |
| 6,135,882 | A | 10/2000 | Kadlic | |
| 6,135,883 | A | 10/2000 | Hachquet | |
| 6,146,271 | A | 11/2000 | Kadlic | |
| 6,149,157 | A | 11/2000 | Suan | |
| 6,159,097 | A | 12/2000 | Gura | |
| 6,159,098 | A | 12/2000 | Slomiany et al. | |
| 6,174,235 | B1 * | 1/2001 | Walker et al. | 463/25 |
| 6,176,781 | B1 | 1/2001 | Walker | |
| 6,190,255 | B1 | 2/2001 | Thomas et al. | |
| 6,220,959 | B1 | 4/2001 | Holmes, Jr. et al. | |
| 6,227,971 | B1 | 5/2001 | Weiss | |
| 6,234,897 | B1 | 5/2001 | Frohm et al. | |
| 6,261,177 | B1 | 7/2001 | Bennett | |
| 6,309,300 | B1 | 10/2001 | Glavich | |
| 6,319,124 | B1 | 11/2001 | Baerlocher et al. | |
| 6,322,309 | B1 | 11/2001 | Thomas et al. | |
| 6,334,613 | B1 | 1/2002 | Yoseloff | |
| 6,346,043 | B1 | 2/2002 | Colin et al. | |
| 6,347,996 | B1 | 2/2002 | Gilmore et al. | |
| 6,358,146 | B1 | 3/2002 | Adams | |
| 6,364,767 | B1 | 4/2002 | Brossard et al. | |
| 6,406,023 | B1 | 6/2002 | Rowe | |
| 6,413,161 | B1 | 7/2002 | Baerlocher et al. | |
| 6,439,995 | B1 | 8/2002 | Hughs-Baird et al. | |
| 6,457,714 | B1 | 10/2002 | Feola | |
| 6,464,582 | B1 | 10/2002 | Baerlocher et al. | |
| 6,514,141 | B1 | 2/2003 | Kaminkow et al. | |
| 6,533,279 | B2 | 3/2003 | Moody et al. | |
| 6,569,013 | B1 | 5/2003 | Taylor | |
| 6,572,471 | B1 | 6/2003 | Bennett | |
| 6,599,185 | B1 | 7/2003 | Kaminkow et al. | |
| 6,604,741 | B1 | 8/2003 | Snow | |
| 6,607,437 | B2 | 8/2003 | Casey et al. | |
| 6,609,974 | B2 | 8/2003 | Mead et al. | |
| 6,695,695 | B2 | 2/2004 | Angel | |
| 6,705,943 | B2 | 3/2004 | Awada | |
| 6,708,975 | B1 | 3/2004 | Fox et al. | |
| 7,004,834 | B2 * | 2/2006 | Walker et al. | 463/16 |
| 7,037,191 | B2 | 5/2006 | Rodgers et al. | |
| 2003/0064793 | A1 * | 4/2003 | Baerlocher et al. | 463/25 |
| 2003/0078096 | A1 | 4/2003 | Kaminkow et al. | |
| 2003/0100357 | A1 | 5/2003 | Walker et al. | |
| 2003/0119583 | A1 | 6/2003 | Kaminkow et al. | |
| 2003/0162578 | A1 | 8/2003 | Baerlocher et al. | |

FOREIGN PATENT DOCUMENTS

| | | | |
|---|---|---|---|
| EP | 0945837 | A2 | 9/1999 |
| EP | 0984409 | A2 | 3/2000 |
| EP | 1 482 460 | A2 | 12/2004 |
| GB | 2 106 292 | A | 4/1983 |
| GB | 2 144 644 | A | 8/1983 |
| GB | 2 335 524 | A | 9/1999 |

OTHER PUBLICATIONS

Anything's Wild Poker Advertisement, written by IGT, published in 2003.
Babooshka Advertisement in Gaming for Africa, written by Atronic, published in May 2002.
Babooshka Article in Strictly Slots, written by Atronic, published in Aug. 2002.
Surf Fruits-Catch the Wave Advertisement, written by Unidesa Gaming, published before May 31, 2003.
Classified index of card games—note particularly Card exchange games (website), <http//www.pagat.com/class/index.html>, written by Commerce Group, published before May 31, 2003.
Cops and Donuts Advertisement, written by IGT, published in Jan. 2003.
Cops and Donuts Article, written by IGT, published in 2001.
Flex Play Poker Advertisement, written by IGT, published in 2001.
Free Fall Poker Game Description, written by IGT, published before May 31, 2003.
Game King 5.1 Poker Advertisement, written by IGT, published in 2003.
Game King Multi-Game 4.0 Poker Plus Advertisement, written by IGT, published in 2002.
Game King Poker Advertisement, written by IGT, published in 2002.
Game King Series Ten Play Draw Poker Advertisement, written by IGT, published in 2002.
Game King Series Triple Play-Five Play Draw Poker Advertisement, written by IGT, published in 2001.
Game King Video Poker Advertisement, written by IGT, published in 2001.
Pick'em Poker Plus Advertisement, written by Bally Gaming Systems, published in 2002.
Price is Right-Cliff Hanger Advertisement written by IGT, published in 2001.
Wave Watchers Advertisement, written by Atronic Casino Technology, published in 2002.
Website, written by Schwimmen, <http://wwwpagat.com/commerce/schwim.html>, published before May 31, 2003.
Website, written by Kemps, <http://www.pagat.com/commerce/kemps.html>, published before May 31, 2003.
Classified Index of Card Games, Card Exchange Games, printed from http://www.pagat.com/class/index.html on Apr. 27, 2006.
Rules of Card Games: Schwimmen, printed from http://www.pagat.com/commerce/schwim.html on Apr. 27, 2006, available in 1995.
Rules of Card Games: Kemps, printed from http://www.pagat.com/commerce/kemps.html on Apr. 27, 2006, available in 1996.
Morehead & Mott-Smith, Hoyle's Rules of Games, Second Revised Edition, Description of Poker on pp. 34 to 63, Description of Hold'em Poker on pp. 47-48, New American Library, New York, 1983.
Description of Texas Hold'em Poker Game available at http://boardgames.about.com/cs/poker/a/texas_rules.htm, game of Texas Hold'em Poker known to the public before at least May 31, 2003.

* cited by examiner

GAMING DEVICE HAVING A PLURALITY OF INTERACTIVE PLAYER-SELECTABLE SYMBOLS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having a plurality of interactive player-selectable symbols.

Gaming device manufacturers strive to make gaming devices that provide as much enjoyment and excitement as possible. Video poker machines, video slot machines and video blackjack machines are well known in the art. Most of these traditional video gaming machines use conventional rules wherein a player has no choice or control over the gaming symbols or the cards that the player is provided during the game. For example, in known video draw poker machines, the gaming device's processor causes five initial cards to be randomly dealt to a player face up from a standard deck of fifty-two cards and allows the player to hold any number of the cards. The processor enables the player to have at least one draw, wherein the player is dealt one or more replacement cards. If the cards after the draw includes a winning hand, the processor provides the player with an award. In known video slot gaming machines, the processor generates a plurality of symbols, and if there is a winning combination of symbols on one or more of the paylines (or in scatter pay), the processor provides the player with an award. In known video blackjack gaming machines, the processor causes two initial cards to be dealt to the player and two initial cards to be dealt to the "dealer" or gaming device. The processor enables the player to "hit" or add more cards to the player's hand as long as the total value of the cards is below or equal to twenty-one. The processor provides an award to the player if the total value of the player's cards is higher than the total value of the dealer's cards and is lower than or equal to twenty-one. In all of the above-mentioned examples the player does not and cannot control the cards or symbols which are provided to the player. This lack of control can frustrate the player and consequently lessen the enjoyment of playing a particular game for that player.

To increase the enjoyment and lessen the frustration of the player, gaming device manufacturers have varied some of the conventional rules of the games played on the gaming devices. One such game is IGT's Triple Play Draw Poker™, wherein the player simultaneously plays multiple hands of poker. In Triple Play Draw Poker™, the player gets one draw for each hand played which reduces the player's overall chance of failure on all hands. However, the player has to place a wager on each of the hands played; thus, the chance of failure relative to the wager for each individual hand is the same as if the player had played only one hand of poker. Consequently, the same lack of control is present in the multi-hand games of poker.

In conventional gaming machines where the player wins an award based upon a winning combination of cards, a winning combination of symbols, or beating the dealer's or gaming device's combination of cards or symbols, the player is frequently frustrated because of the strict rules of the game. The ability to control or select the cards and/or symbols provided to the player would additionally give the player control over his or her chances of winning and would increase the enjoyment of the player.

Games that increase the opportunities and chances to obtain awards are desirable. Players are attracted to games that have increased chances of obtaining sizable awards. Players are attracted to games where the players have more interaction and control over their chances of winning. Therefore, to increase player enjoyment and excitement, it is desirable to provide new games.

SUMMARY OF THE INVENTION

The present invention relates in general to a gaming device having a plurality of interactive player-selectable symbols. More particularly, the gaming device's processor offers a player a plurality of interactive player-selectable symbols during the course of a game or games played on the gaming device. The player may select one or more of the interactive player-selectable symbols from one or more offer sets to either form or complete a combination of symbols. The processor adds the player-selected symbol from the offer set to the player's combination of symbols, and determines if the player's completed combination of symbols includes a predetermined winning combination of symbols. If the player's completed combination of symbols includes the predetermined winning combination of symbols, the processor provides the player with an award.

The processor of the gaming device determines whether the player has won an award based upon the player's completed combination or combinations of symbols and the particular game which is being played by the player on the gaming device. The present invention can include a plurality of primary or associated bonus games, and thus the processor's determination of whether the player holds a winning combination of symbols may depend on the type of game which is being played. For instance, in one embodiment of the present invention, if the player's completed combination of symbols includes a predetermined winning combination of symbols, the processor provides the player with an award. In another embodiment, if the total value of the player's completed combination of symbols is greater than a value of a combination of symbols provided to the gaming device or "dealer", the player is provided with an award. It should be understood that there are more ways in which a player may achieve a winning combination of symbols than what are described in the above illustrative examples.

The interactive player-selectable symbols in the offer set or sets can include any suitable symbol which is used during the course of the game or games associated with the gaming device. An interactive player-selectable symbol can be any element, value, gaming card and/or symbol which corresponds to a theme or game associated with the gaming device.

The interactive player-selectable symbols in the present invention provide new player decision-making and excitement which are not present in known gaming devices. The interactive player-selectable symbols also provide new variables which can be used to vary the players' probabilities of winning on the gaming devices. For instance, one known method in which a gaming device manufacturer or owner may vary the player's chances of winning is to increase the number of a particular symbol or symbols within a plurality of symbols which are available to the player, wherein the particular symbol is included in a winning combination or combinations of symbols. In such case, the greater the number of the "winning" symbol or symbols which are included in said plurality of symbols, the greater probability that the winning symbol or symbols will be provided to the player during the course of a game. This increased probability of providing the player with the winning symbol or symbols increases the chances that the winning combinations of symbols will be provided to the player. For example, to increase the probability of providing a winning combination of symbols to a player on a payline of a slot gaming machine, the gaming manufacturer or owner can increase the number of symbols on the gaming reels for that particular winning combination. The greater the number of symbols included in the winning combination of symbols which are on the gaming reels, the greater the chances that the winning combination of symbols will be generated on one of the paylines of the gaming device.

Another known variable which the gaming manufacturer may vary to increase or decrease the player's chances of winning and receiving an award is the number of winning combinations of symbols in a particular game. As the number of winning combinations of symbols increases, the chances of the player being provided with one of the winning combination of symbols increases because of the greater number of winning combinations available to the player.

Yet another known variable which the gaming manufacturer may adjust is the manner in which the combination of symbols is provided. For example, in the slot gaming machine, the gaming manufacturer may increase the number of paylines included in the game. Thus, the chances of achieving the winning combination or combinations of symbols is increased because the different ways a player may be provided with a winning combination of symbols is increased.

In the present invention, a gaming manufacturer can increase the number of player-selectable symbols in an offer set or increase the number of offer sets to vary the probabilities of the player achieving a winning combination of symbols. The greater the number of symbols which a player can select from, the greater the chances are that the player will be able to achieve a winning combination of symbols. Thus, a gaming manufacturer can use either the number of symbols in an offer set or the number of offer sets to vary the player's probability of winning. These variables are not included in known gaming devices and provide a plurality of new ways in which a gaming manufacturer can increase a gaming device's attractiveness.

The present invention also includes a number of other variables which the gaming manufacturers may use to vary the player's probabilities of winning. In one embodiment of the present invention, wherein the game being played is a card game, one variable is the number of cards offered in the offer set or sets. Another variable which the gaming manufacturers can vary in the card game is the number of hands played by the player. In another embodiment of the present invention, wherein the game being played is a slot machine, one variable is the number of symbols offered in the offer set or sets. Another variable which the gaming manufacturers can vary in the slot machine is the number of paylines offered to the player, and yet another variable is the number of positions in which the symbol or symbols from the offer set or sets can be placed in. It should be understood that different embodiments of the present invention can incorporate one or more of these or other suitable variables.

The control of the player over one or more of the symbols in his or her set of symbols in the present invention increases the player's chances of achieving a winning combination of symbols. For example, in one embodiment of the present invention, there is a plurality of winning combinations of symbols, the processor provides the player with an initial set of symbols and a plurality of sequential offer sets. In this embodiment, the player has to decide on which of the plurality of winning combinations of symbols he or she is most likely to achieve based on the symbols in the initial set, and then select the symbols from the offer sets which he or she thinks will provide the best odds of achieving a winning combination of symbols. Thus, the player can utilize his or her decision-making to increase the chances of winning the game. This decision-making increases a player's enjoyment and anticipation when playing a game which includes the present invention.

Another variable which may be used in the present invention is to obscure or mask one or more of the symbols being used in the game. In one embodiment of the present invention, some or all of the symbols in the offer set could be masked or obscured until selected by the player. In one embodiment, the symbols in subsequent sets after the initial set could be masked or obscured. In another embodiment, some or all of the symbols in the initial set could be masked or obscured initially. The obscured or masked symbols could be revealed when the initial sets are completed or the player increases his wager to reveal the masked symbols. Other variations for masking the symbols are within the scope of the present invention.

In one embodiment of the present invention, wherein the game is a multi-hand game of poker, the initial hand is dealt face up and the remaining hands are dealt face down. The player could either choose to play the game in this manner or increase his or her wager to reveal the face down cards in the hands. In another embodiment, at least one card in each of the player's initial hand or hands could be face down.

A plurality of different embodiments of the present invention are described below, however these embodiments are demonstrative and do not illustrate all of the ways in which the present invention may be used and as such are not intended to limit the use of the present inventions to these specific embodiments.

In one embodiment of the present invention, the processor determines the symbols or symbols in an initial set of symbols. The number of symbols in the initial set of symbols is less than the number of symbols in a predetermined winning combination of symbols. The processor provides the player with the initial set of symbols. The processor determines the interactive player-selectable symbols in an offer set. The processor offers to the player the offer set of interactive player-selectable symbols to the player and enables the player to select one or more of the symbols from the offer set. The processor adds the player-selected symbols from the offer set to the initial set of symbols to form a completed set of symbols. If the symbols in the completed set of symbols include the symbols in the predetermined winning combination of symbols, the processor provides the player with an award.

In another embodiment of the present invention, the interactive player-selectable symbols are values offered to the player in an offer set. The processor determines the value or values in an initial set of values and provides the player with the initial set of values. The processor determines the values in an offer set and offers the offer set of values to the player. The processor enables the player to select one or more of the values from the offer set. The processor adds the player-selected values from the offer set to the initial set of values to form a completed set of values. The processor determines the values in a gaming device's or dealer's set of values. If the total value of the values in the player's set of values, after the addition of the player-selected values from the offer set, is greater than the total value of the values in the dealer's set of values, the processor provides the player with an award.

It should be appreciated that the present invention can be applied to conventional gaming devices such as a poker game, a slot machine or a blackjack game. It should also be appreciated that the present invention can be applied to other types of games or gaming devices wherein a player is provided with a plurality of symbols.

In one embodiment of the present invention, the interactive player-selectable symbols are gaming cards for a conventional deck of playing cards offered to the player in a video draw poker game. The gaming device enables a player to play a single-hand poker game or a multi-hand poker game. In one embodiment, the processor determines a number of initial cards in a hand and provides or deals the player the initial cards. The number of initial cards is less than the number of cards required for a complete hand in the poker game. In most conventional video draw poker games, five cards are needed for a complete poker hand. The processor determines the cards in an offer set of cards, offers the offer set to the player, and enables the player to select one or more of the cards in the offer set of cards. The processor adds the player-selected cards from the offer set to the hand with the initial cards to form a complete hand. If the cards in the complete hand after the addition of the player-selected cards includes a predetermined winning hand, the processor provides the player with an award.

It should be appreciated that the processor can offer the player one or more offer sets. The processor can offer the plurality of offer sets simultaneously or sequentially. In one embodiment of the present invention, the processor offers a plurality of offer sets from which the player can select an offer set of cards to select cards from. In another embodiment, the processor offers the player a new offer set of cards after the player selects one of the cards from a previous offer set.

It should also be appreciated that the processor can offer the player the offer sets in multiple-hand video poker games. In one embodiment of the present invention, the player plays multiple hands of cards in a multiple-hand poker game. The player is provided with a plurality of hands of initial cards. Each of the plurality of hands includes a number of initial cards which is less the number of cards required for a complete hand in the poker game. The processor determines the cards in the offer set of cards, and offers the offer set to the player. In one embodiment, the number of cards in the offer set is equal to the number of hands being played by the player. The processor enables the player to select the cards from the offer set and to choose the hands that each of the cards from the offer set will be added to. In this embodiment, the processor allows the player to select one card from the offer set for each of the initial hands, however, in alternative embodiments, the player can select the cards from the offer set to add to the player's hands in any suitable manner the player chooses. After the processor adds the player-selected cards to the player-chosen hands, the processor determines and offers the player a new offer set of cards to select from. The processor again enables the player to select cards from the offer set to be placed into player-chosen hands, and adds the player-selected cards from the offer set to the player-chosen hands. The processor offers the player as many offer sets as the player needs to complete each of the hands. After the player completes each of the plurality of hands, the processor determines if the combination of cards in each hand includes a predetermined winning hand of cards. If the cards in one or more of the hands includes the cards in the winning hand, the processor provides the player with an award.

It should be appreciated that the award for a predetermined winning hand of cards can be based upon one or a plurality of paytables.

In an alternative embodiment of the present invention, the processor offers the player an offer set which includes a plurality of cards wherein the number of cards is large enough that the player can select cards to complete each of the hands of cards in the multiple-hand video poker game.

It should be appreciated that the processor may also initially provide the player with a complete hand of cards in a video poker game, and offer the player the offer sets of cards when the player requests one or more "draws." In one embodiment of the present invention, the processor determines the initial cards in a hand in a video poker game, and provides the hand of initial cards to the player. If the player requests a draw, the processor determines the cards in an offer set, and offers the offer set of cards to the player. The processor enables the player to select one or more of the initial cards in the player's hand to discard, and enables the player to select one or more of the cards from the offer set as replacement cards. The processor replaces the discarded cards in the player's hand with the replacement cards. If the player's hand after the draw includes a winning hand, the processor provides the player with an award.

In one embodiment of the present invention, the interactive player-selectable symbols are gaming symbols or symbols offered to the player in a video slot gaming machine. The processor determines the symbols to be displayed to the player on a plurality of gaming reels. The processor also determines a number of positions on the plurality of gaming reels which will not display any symbols and will be left blank. The processor displays the plurality of gaming reels with the symbols and the blank positions to the player. The processor determines the symbols to be offered to the player in at least one offer set. The processor offers the player the offer set, and enables the player to select one or more of the symbols from the offer set to be placed into one or more of the blank positions displayed by the plurality of gaming reels. The processor adds the player-selected symbols to the player-chosen blank positions. If any of the symbols on one or more predetermined paylines include a predetermined winning combination of symbols, the processor provides the player with an award.

In another embodiment of the present invention, the plurality of gaming reels initially displays a plurality of symbols to the player. The processor enables the player to select the symbols from the offer set to replace one or more of the symbols initially displayed by the plurality of gaming reels.

It should be appreciated that there may be a plurality of sets of gaming reels. It should be appreciated that the processor may randomly determine the symbols and blank positions initially displayed by the plurality of gaming reels. It should also be appreciated that the processor may randomly determine the symbols offered to the player in the offer set.

In one embodiment of the present invention, the interactive player-selectable symbols are gaming cards offered to the player during a video blackjack game. In one embodiment, the processor determines the cards in the hand to be provided to the player and the cards in the hand to be provided to the gaming machine or "dealer." The processor reveals one card in the dealer's hand to the player, and enables the player to request additional cards to the player's hand or take a "hit." The processor determines a plurality of cards to be offered to the player in the offer set. The processor offers the offer set to the player, and enables the player to select at least one of the cards to be added to the player's hand. The processor adds the player-selected card or cards to the player's hand. If the player requests an additional hit, the processor determines the cards in another offer set and offers the offer set to the player. The processor reveals the cards in the dealer's hand to the player, and determines whether to hit the dealer's hand. After the processor determines that the dealer's hand is complete, if the cards in the player's hand has a total value more than the cards in the dealer's hand but not greater than a total value of twenty one, the processor provides the player with an award.

It should be appreciated that the player can play multiple hands of cards in the video blackjack game. In one embodiment of the present invention, the processor determines the cards to be provided to the player in a plurality of blackjack hands and the cards to be provided to the dealer's hand. The processor provides the plurality of hands to the player. The processor reveals one card in the dealer's hand to the player. If the player requests a hit, the processor determines the plurality of cards to be offered to the player in the offer set. The processor offers the offer set to the player, and enables the player to select one or more of the plurality of cards to be added to the player's plurality of hands. If the player requests another hit, the processor again determines the plurality of cards to be offered to the player in a new offer set, and offers the offer set to the player. The processor reveals the cards in the dealer's hand to the player, and determines whether to hit the dealer's hand. After the dealer's hand is complete, if the total value of the cards in one or more of the player's plurality of hands is greater than the total value of the cards in the dealer's hand but not greater than a total value of twenty one, the processor provides the player with an award.

In an alternative embodiment, only one offer set of cards is offered and the player selects a plurality of cards to be added to one or more of the player's hands of cards.

It should be appreciated that the processor can provide an award to the player when the total value of the cards in the player's hand or hands match or is greater than a winning value.

It should be appreciated that there may be a plurality of offer sets of interactive player-selectable symbols.

It should be appreciated that there may be any number of interactive player-selectable symbols in an offer set.

It should be appreciated that the number of interactive player-selectable symbols or offer sets can be based upon a wager made by the player.

It should be appreciated the processor may determine the plurality of interactive player-selectable symbols in one or more offer sets based upon a probability associated with each interactive player-selectable symbol.

It should be appreciated the processor may determine the plurality of interactive player-selectable symbols in one or more offer sets in a random manner.

It should be appreciated that the present invention could also be used in conjunction with other games such as keno gaming machines.

It should be appreciated that the processor can enable the player to deselect the player-selected cards from the offer set.

It should be appreciated that the present invention could include multiple players participating in one or more games.

It is an advantage of the present invention to provide a gaming device that gives the player control over the symbols which are provided to the player during the course of a game played on a gaming device.

It is a further advantage of the present invention to provide a gaming device which increases the chances of the player obtaining an award.

Other objects, features and advantages of the invention will be apparent from the following detailed disclosure, wherein like numerals refer to like parts elements, components, steps and processes.

DETAILED DESCRIPTION OF THE INVENTION

Gaming Device and Electronics

Figure 1A:
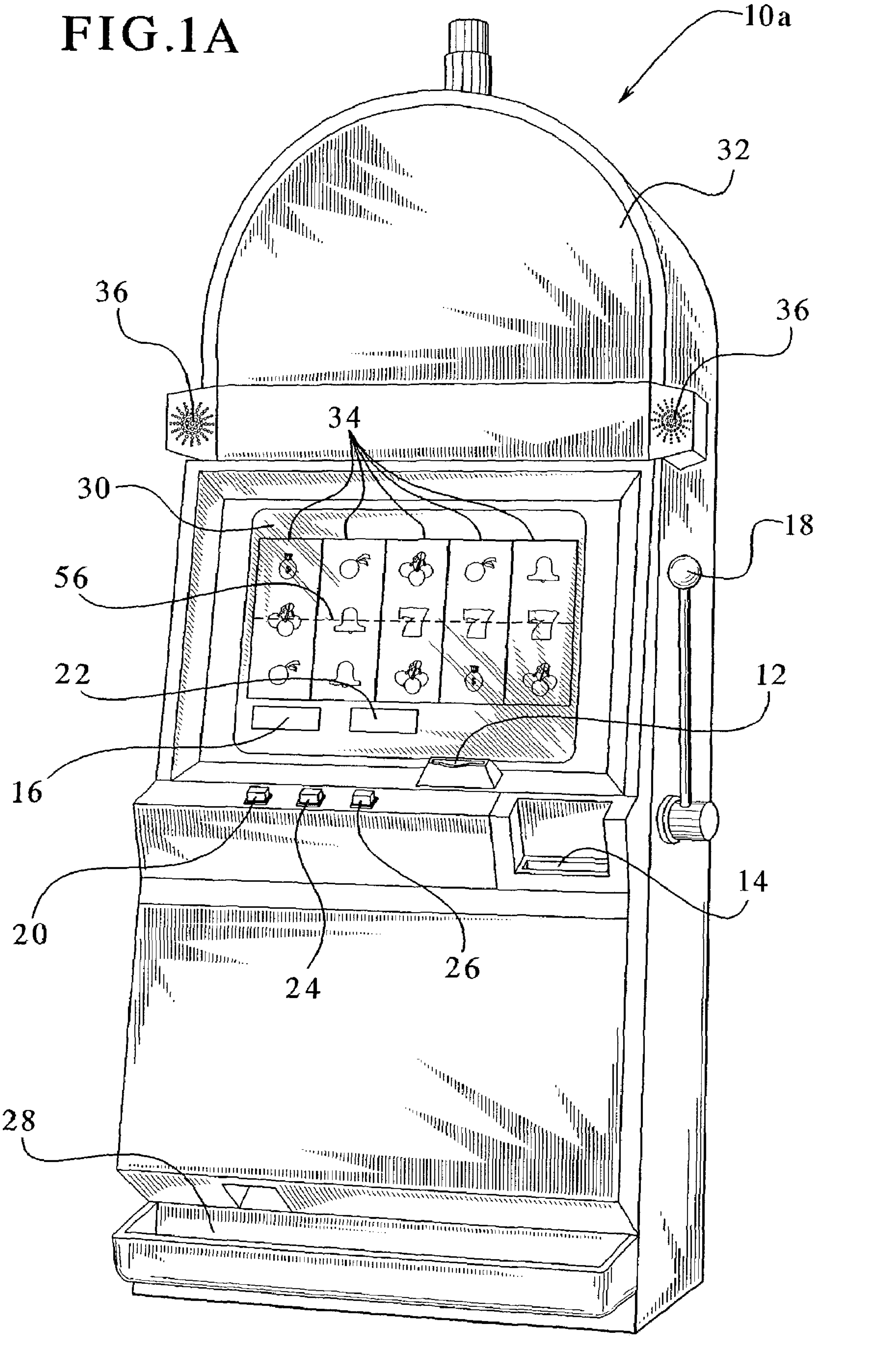
FIG. 1A is a front perspective view of one embodiment of the gaming device of the present invention.
Figure 1B:
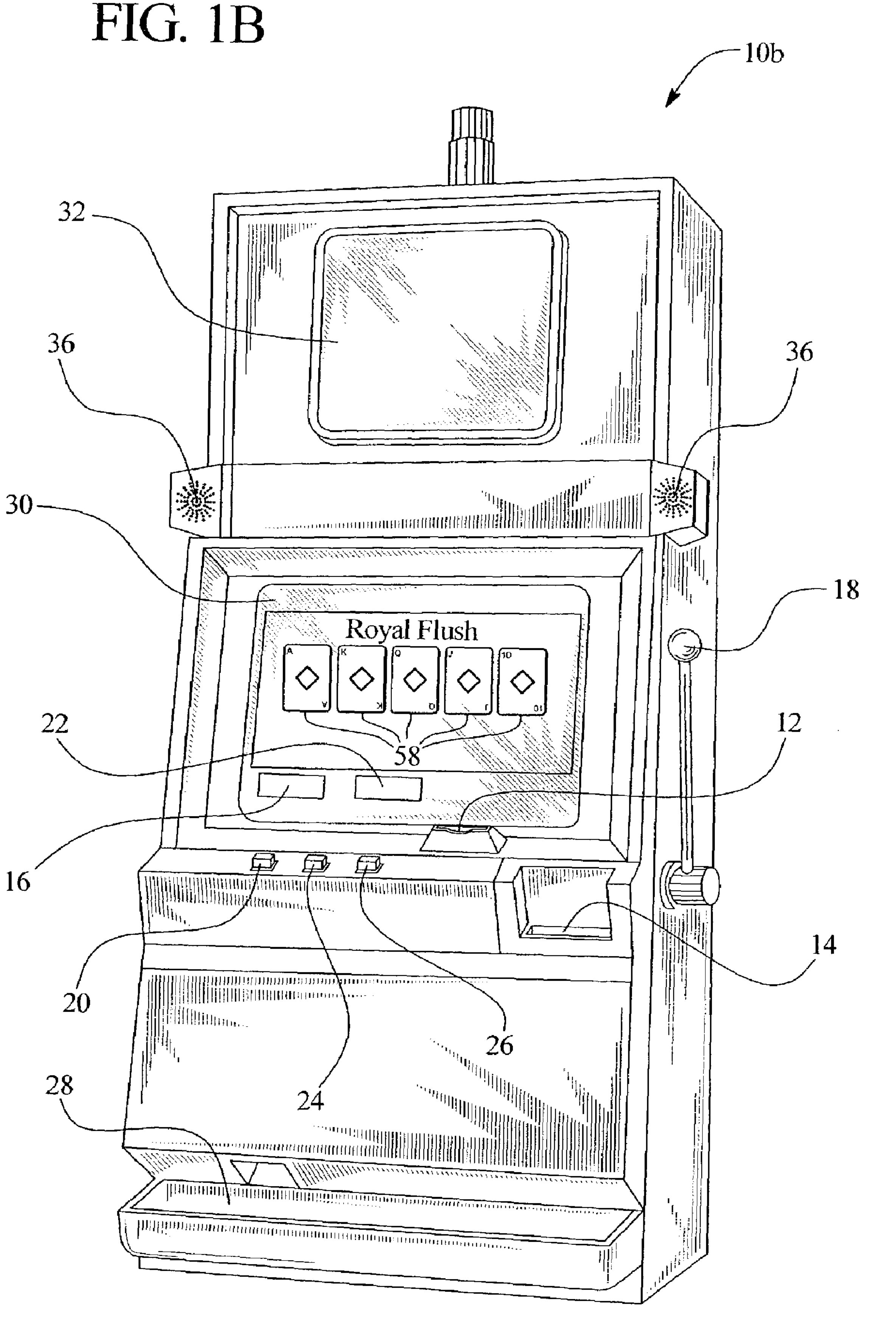
FIG. 1B is a front perspective view of one embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment is a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform, such as a personal digital assistant ("PDA") or the like.

Gaming device 10 can incorporate any primary game such as slot, poker or keno, any of the bonus triggering events and any of the bonus round games related thereto. The symbols and indicia used on and in gaming device 10 may include symbols and indicia in electronic, electrical or video form or combinations thereof.

As illustrated in FIGS. 1A and 1B, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in video form at one or more of the display devices. A display device can be any viewing surface such as glass, a video monitor or screen, a liquid crystal display or any other display mechanism.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
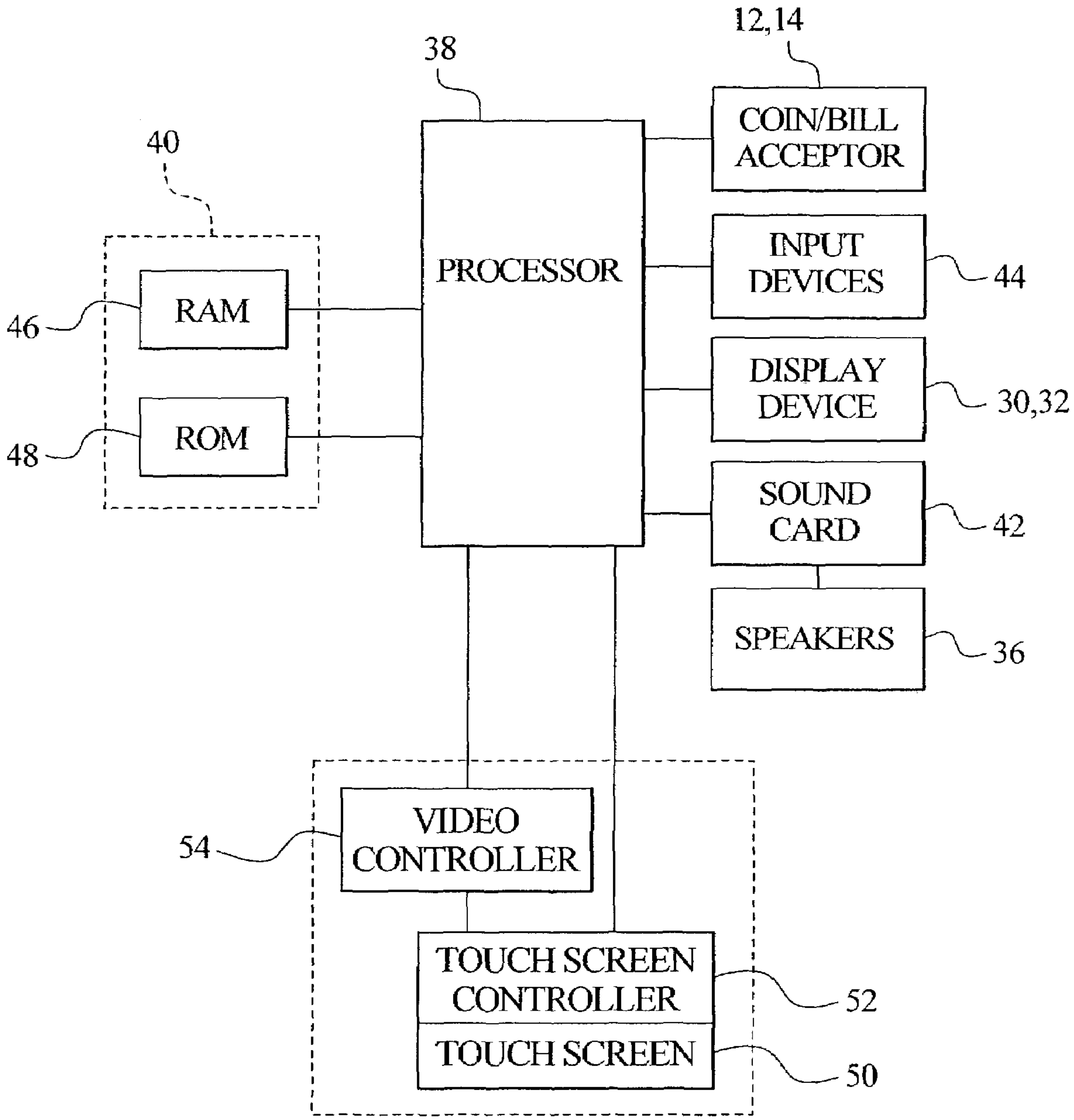
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of causing the display of images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively and/or individually referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. It is also possible through the use of networks and the like, the present invention has the capability to allow multiple players to participate in one or more games. The processor 38 and memory device 40 is generally referred to herein as the computer or controller.

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines displayed in a horizontal and/or diagonal fashion.

In addition to the processor 38 determining the symbols or plurality of symbols provided to the player, the processor 38 may also enable the player to select one or a plurality of symbols to be used interactively in a game that is being played on the gaming device 10. In this manner, the processor 38 provides the player control over his or her outcome, and gives the player the opportunity to win larger and more awards than in known gaming devices.

Interactive Player-selectable Symbols

The interactive player-selectable symbols provide gaming device manufacturers a plurality of new ways in which the probabilities of providing the player with a winning combination or combinations can be increased or decreased. The manner in which the player-selectable symbols are offered to the player and the number of player-selectable symbols offered in a game are new variables which can be used to adjust a player's probability of winning. For instance, symbols in winning combinations can now be offered to the player through the use of an offer set or a plurality of offer sets of player-selectable symbols. The offer sets provide a way that an increased number of "winning" symbols can be made available to the player. Varying the number of symbols in winning combinations of symbols in the offer sets directly affects the chances of a player achieving a winning combination because the probability of the player having a winning combination is proportional to the number of symbols in the winning combination offered to the player. The offer sets of player-selectable symbols provide a new way in which the number of symbols available to the player can be varied, thus affecting a player's probability of achieving a winning combination.

The offer set or sets of interactive player-selectable symbols in addition to offering new variables with which to adjust the chances of a player winning a game also offers players new decision-making choices. This decision-making increases the player excitement and, thus, increases the attractiveness of the gaming device which includes the present invention.

In one embodiment of the present invention the processor 38 offers a plurality of interactive player-selectable symbols to the player which the player may select from to be used in the game being played on the gaming device 10. The interactive player-selectable symbols can be used in a multitude of games or games of chance wherein the player is provided with symbols or values. The interactive player-selectable symbols can be any suitable symbol which is used during the course of the game or games associated with the gaming device 10. An interactive player-selectable symbol may be any element, value, gaming card and/or symbol which corresponds to a theme or game associated with the gaming device. The processor 38 offers the interactive player-selectable symbols to the player in one or more offer sets. The processor 38 enables the player to select one or more of the interactive player-selectable symbols from the offer set to add to, form or complete a combination of symbols or replace a symbol which was previously provided to the player.

Figure 3:
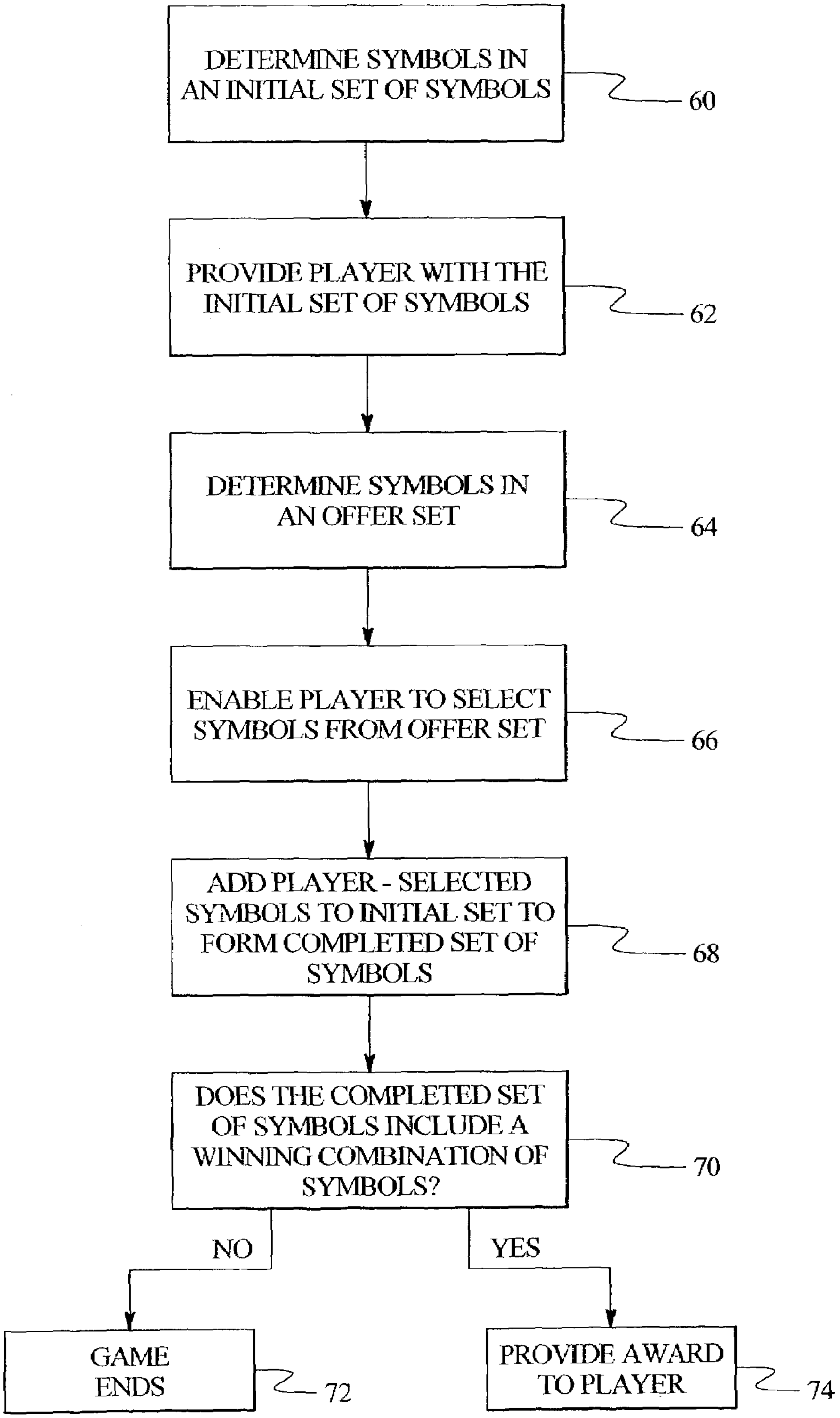
FIG. 3 is a flow diagram of one embodiment of a method of the present invention.

FIG. 3 illustrates a flow diagram of one embodiment of a method of the present invention. In one embodiment, the interactive player-selectable symbols are a plurality of gaming symbols. The processor 38 determines the symbols in an initial set of symbols as shown by block 60. The processor 38 provides or displays to the player an initial set of symbols as shown by block 62. The processor 38 determines the interactive player-selectable symbols or symbols in an offer set as shown by block 64. The processor 38 enables the player to select the symbols from the offer set as shown by block 66. The processor 38 adds the player-selected symbols to the initial set of symbols to form a completed set of symbols as shown by block 68. The processor 38 determines if the completed set of symbols includes a winning combination of symbols as shown by block 70. If the processor 38 determines that the completed set of symbols does not include the winning combination of symbols, the processor 38 ends the game as shown by block 72. If the processor 38 determines that the completed set of symbols includes the winning combination of symbols, the processor 38 provides an award to the player as shown by block 74.

Figure 4:
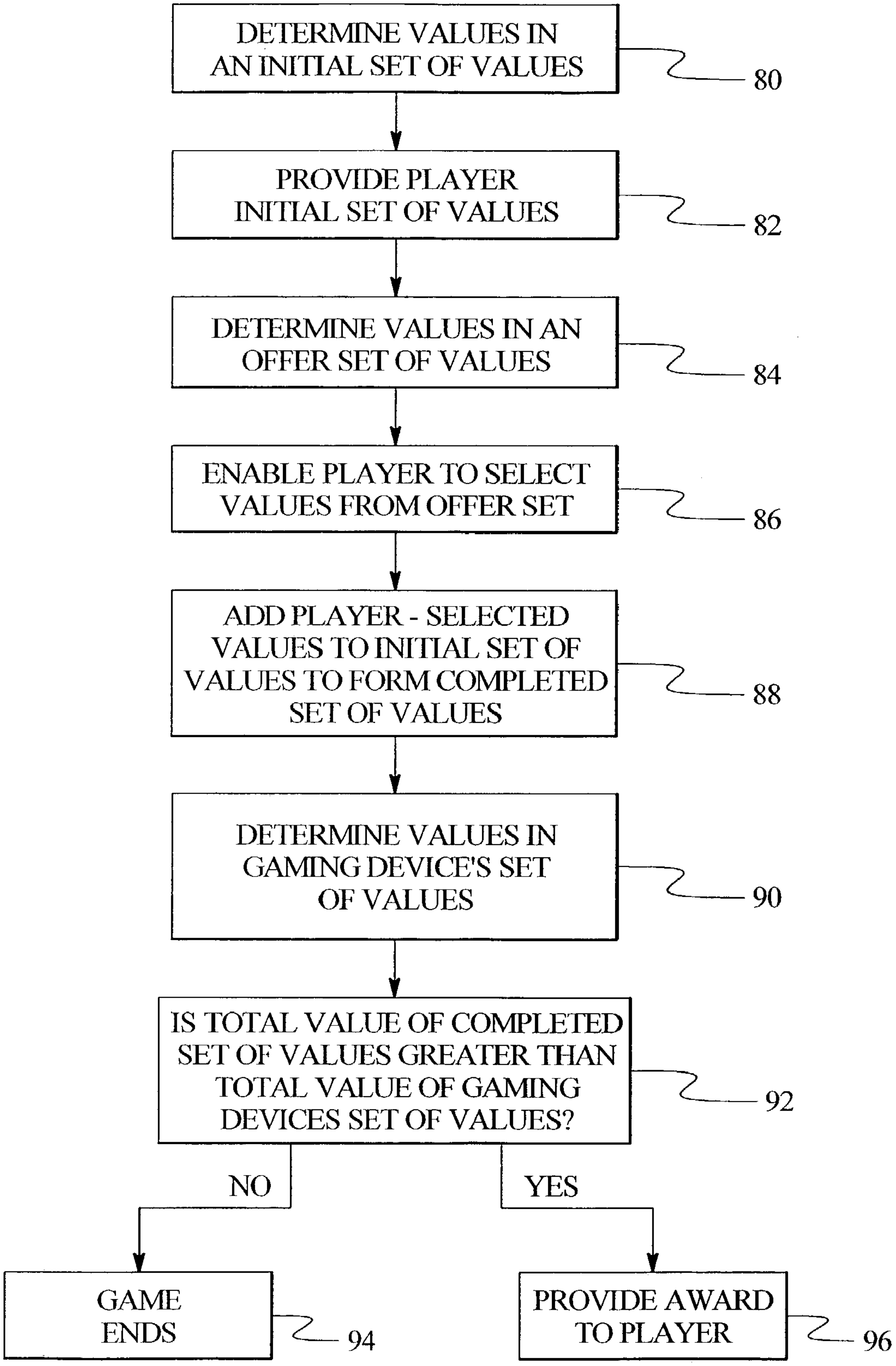
FIG. 4 is a flow diagram of one embodiment of a method of the present invention.

In an alternative embodiment of the present invention, the interactive player-selectable symbols are a plurality of values. In one embodiment illustrated in FIG. 4, the processor 38 determines the values in an initial set of values as shown by block 80. The processor 38 provides the player with the initial set of values as shown by block 82. The processor 38 determines the values in an offer set of values as shown by block 84. The processor 38 enables the player to select values from the offer set as shown by block 86. The processor 38 adds the player-selected values to the initial set of values to form a completed set of values as shown by block 88. The processor 38 determines the values in the gaming device's set of values as shown by block 90. The processor 38 evaluates the player's set of values and the gaming device's set of values to determine which one is greater as shown by block 92. If the total value of the gaming device's values is greater than the total value of the player's completed set of values, the processor ends the game as shown by block 94. If the total value of the player's completed set of values is greater than the total value of the gaming device's set of values, the processor provides an award to the player as shown by block 96.

Figure 5A:
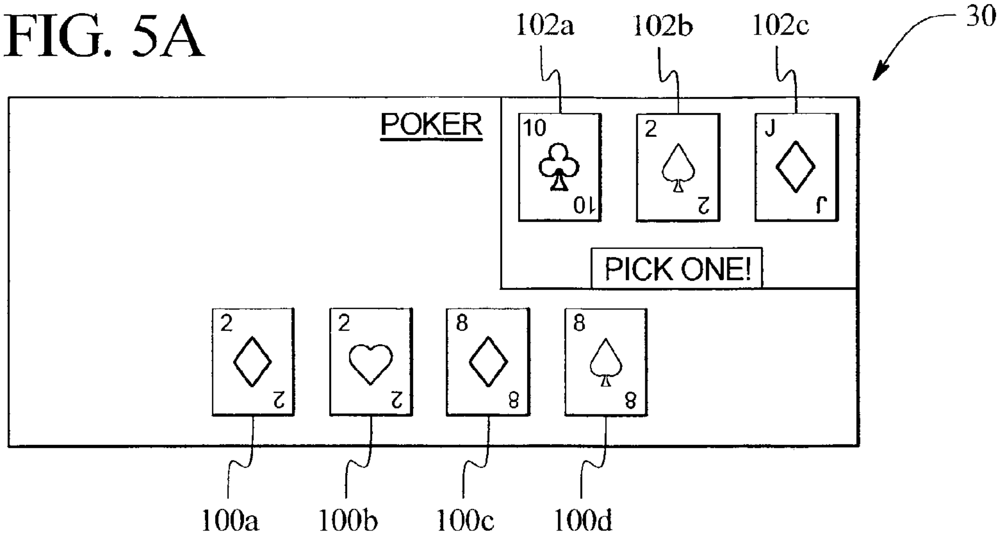
FIG. 5A is an enlarged front elevation view of one of the display devices of FIGS. 1A and 1B illustrating one embodiment of the present invention, wherein in a video poker game the processor provides a hand of cards and offers a plurality of cards in an offer set to a player.
Figure 5B:
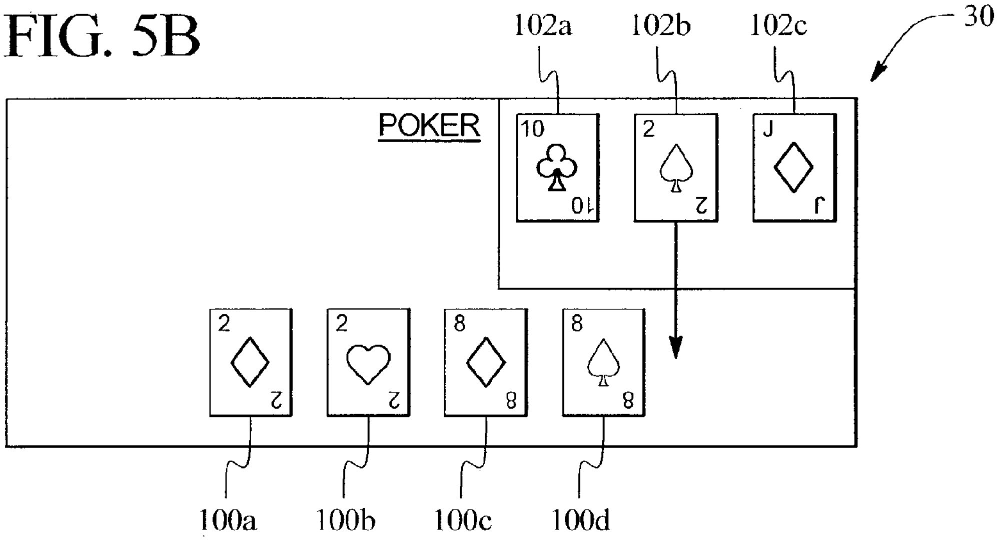
FIG. 5B is a view of the embodiment of the present invention illustrated in FIG. 5A, wherein the processor adds the player-selected card from the offer set to the player's hand of cards.
Figure 5C:
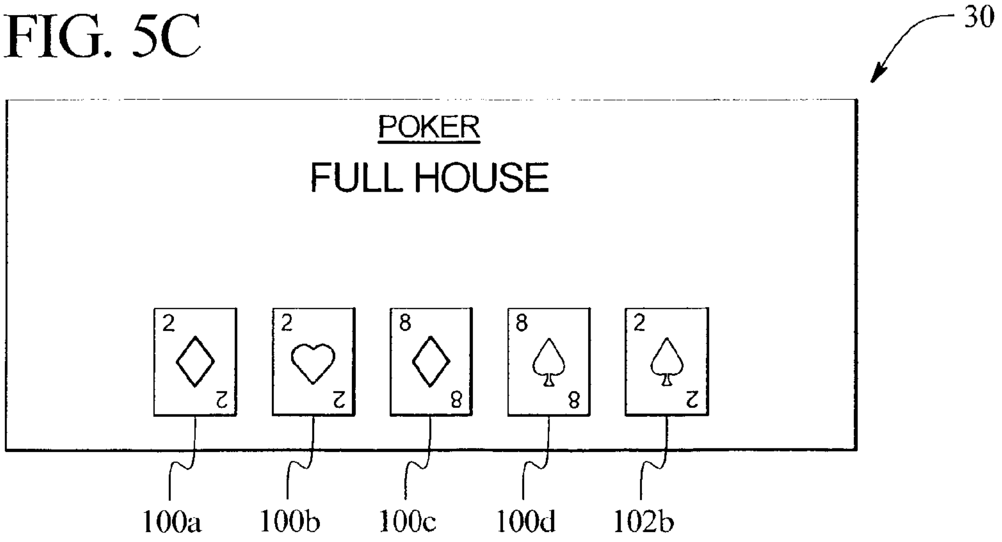
FIG. 5C is a view of the embodiment of the present invention illustrated in FIG. 5A, wherein the processor causes the display of the player's completed hand of cards which forms a Royal Flush.

In one embodiment of the present invention the game which is played on the gaming device 10 is a video poker game, and the plurality of interactive player-selectable symbols include cards from a deck or decks of gaming cards. In one embodiment, the processor 38 determines, and displays face-up to the player a hand of initial cards 100*a*, 100*b*, 100*c* and 100*d* as illustrated by FIG. 5A. In this embodiment of the present invention, the number of cards in a complete hand in the poker game is five. As illustrated in FIG. 5A, the processor 38 provides four initial cards, a Two of Diamonds 100*a*, a Two of Hearts 100*b*, an Eight of Diamonds 100*c* and an Eight of Spades 100*d* to the player. The processor 38 determines and displays face-up the cards, a Ten of Clubs 102*a*, a Two of Spades 102*b* and a Jack of Diamonds 102*c*, in an offer set and offers the offer set of cards 102*a*, 102*b* and 102*c* to the player. The processor 38 enables the player to select one of the cards 102*b* from the offer set of cards 102*a*, 102*b* and 102*c* to add to the player's initial cards 100*a*, 100*b*, 100*c* and 100*d* to form a complete hand. In this embodiment, the player selects the Two of Spades 102*b*. The processor 38 adds the player-selected card 102*b* to the player's hand of initial cards 100*a*, 100*b* and 100*c* as illustrated in FIG. 5B. The processor 38 causes the display device 30 to display the player's complete hand of cards 100*a*, 100*b*, 100*c*, 100*d* and 102*b* as illustrated in FIG. 5C. The processor 38 determines whether the player's complete hand of cards 100*a*, 100*b*, 100*c*, 100*d* and 102*b* matches or includes a predetermined winning combination of cards. In this embodiment, the processor 38 determines that the player's complete hand of cards which includes the Two of Diamonds 100*a*, the Two of Hearts 100*b*, the Eight of Diamonds 100*c*, the Eight of Spades, 100*d*, the Two of Spades 102*b* is a Full House and causes the display device 30 to indicate to the player that the player's complete hand of cards 100*a*, 100*b*, 100*c* and 102*b* includes a Full House.

It should be appreciated that in an alternative embodiment, the number of cards initially provided to the player can be more or less than the four cards 100*a*, 100*b*, 100*c* and 100*d* provided in the above-described embodiment.

Figure 6A:
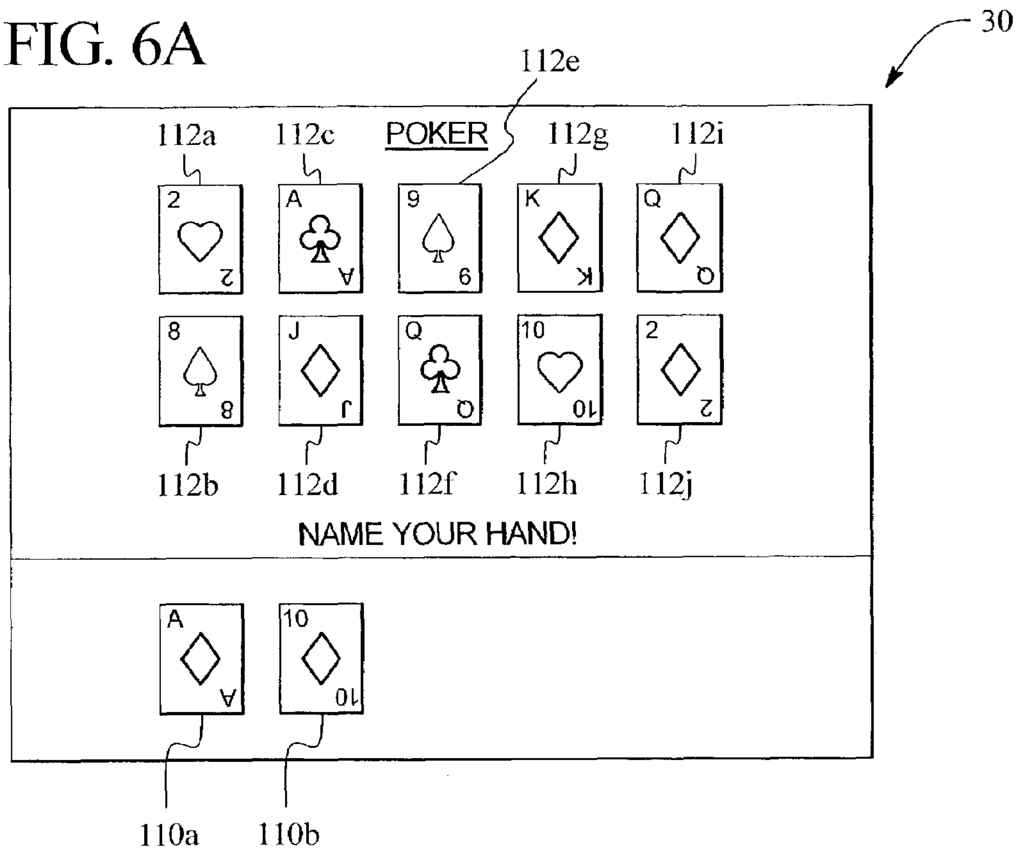
FIG. 6A is an enlarged front elevation view of one of the display devices of FIGS. 1A and 1B illustrating one embodiment of the present invention, wherein in a video poker game the processor provides a hand of cards and offers a plurality of cards in an offer set to a player.
Figure 6B:
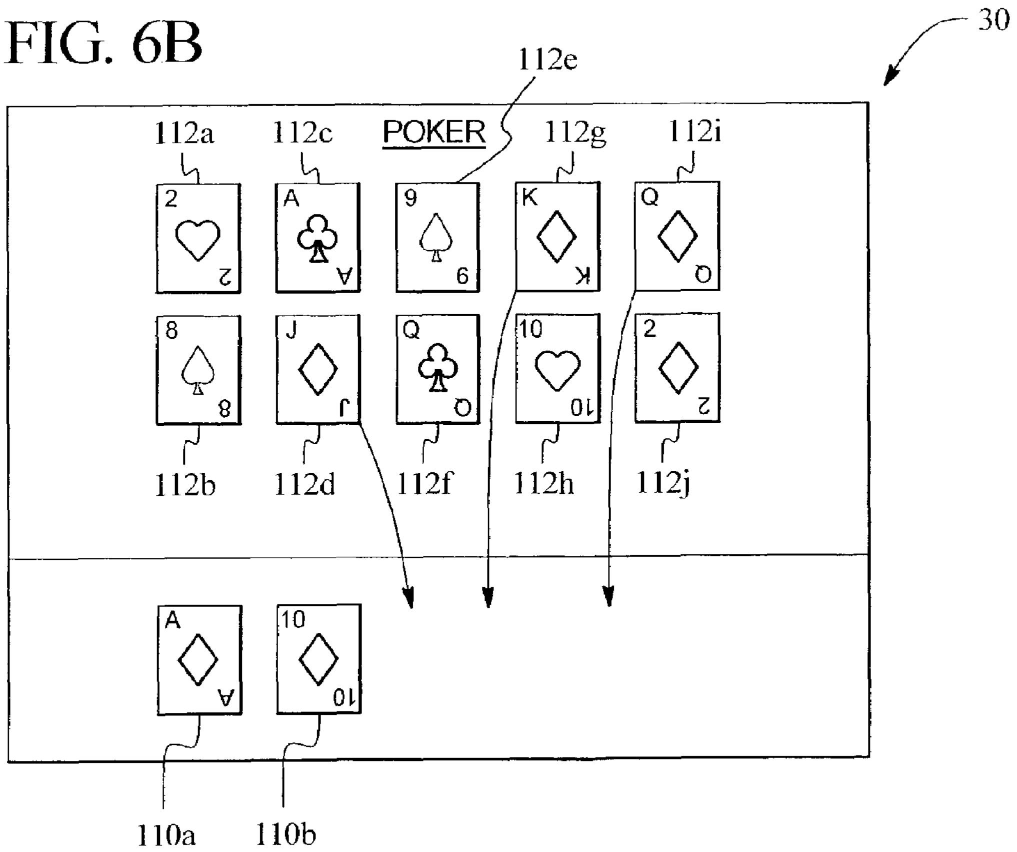
FIG. 6B is a view of the embodiment of the present invention illustrated in FIG. 6A, wherein the processor adds the plurality of player-selected cards from the offer set to the player's hand of cards.
Figure 6C:
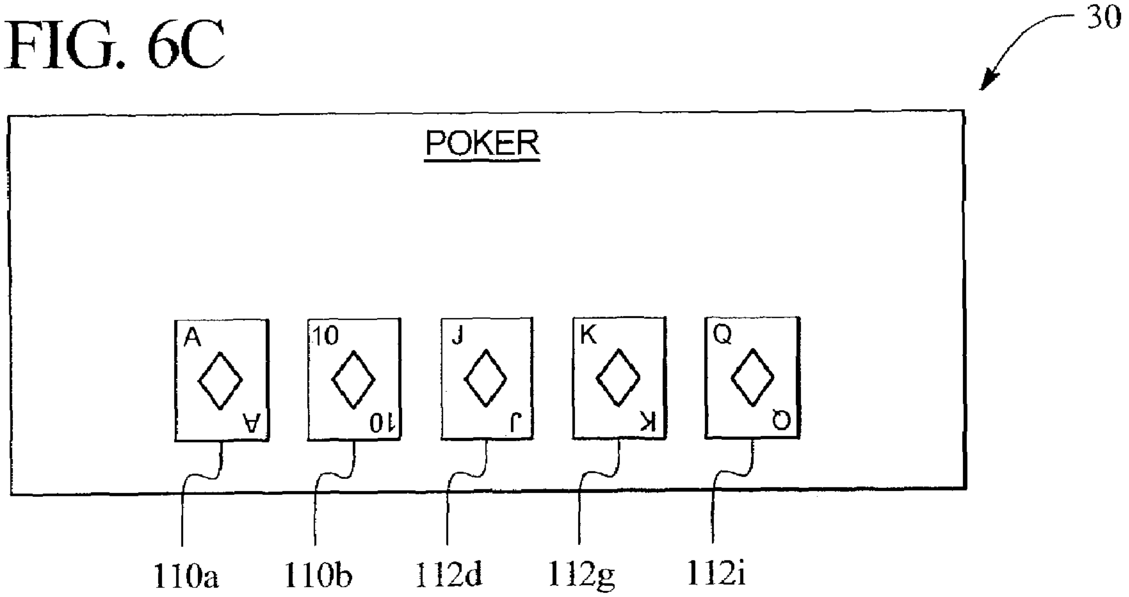
FIG. 6C is a view of the embodiment of the present invention illustrated in FIG. 6A, wherein the processor causes the display of the player's completed hand of cards.
Figure 6D:
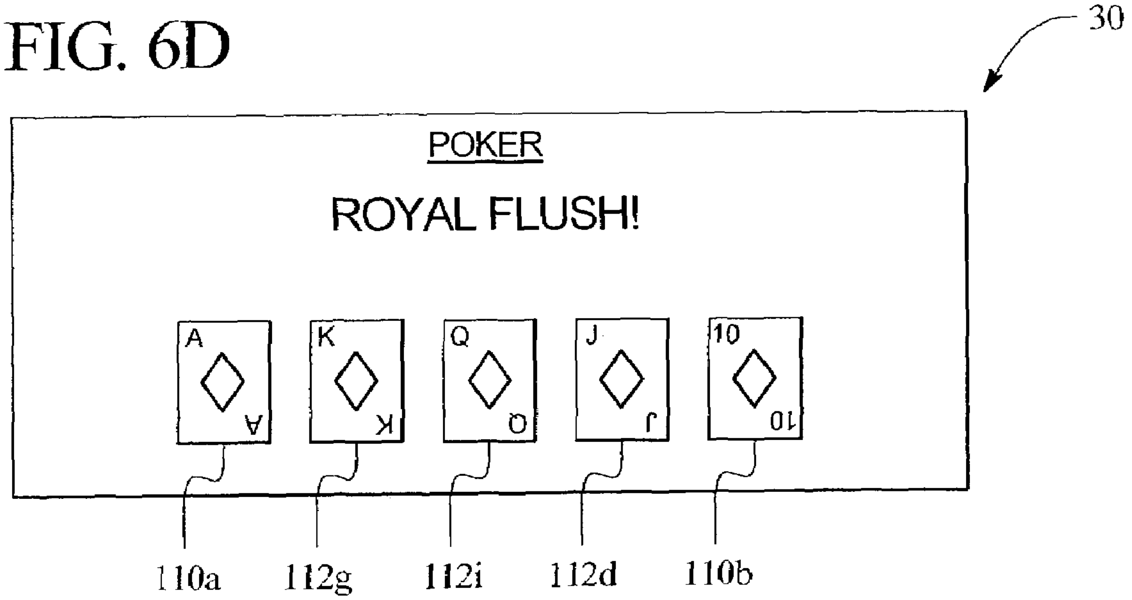
FIG. 6D is a view of the embodiment of the present invention illustrated in FIG. 6A, wherein the processor causes the display of the cards in the player's completed hand which forms a Royal Flush.

In one alternative embodiment, the game being played on the gaming device 10 is a video poker game and the plurality of interactive player-selectable symbols includes gaming cards from one or more card decks. The processor 38 determines, provides and displays (face-up) to the player a plurality of initial cards, the Ace of Diamonds 110*a* and the Ten of Diamonds 110*b*, as illustrated in FIG. 6A. In this embodiment, the number of cards in a complete hand in the poker game is five. The processor 38 determines and offers an offer set which includes a plurality of cards 112*a*, 112*b*, 112*c*, 112*d*, 112*e*, 112*f*, 112*g*, 112*h*, 112*i* and 112*j* to the player. The processor 38 enables the player to pick one or more cards from the offer set of cards to add to the player's initial cards 110*a* and 110*b*. In this embodiment, the processor 38 adds the player-selected cards 112*d*, 112*g* and 112*i* from the offer set of cards to the player's initial cards 110*a* and 110*b* to form a complete hand of cards 110*a*, 110*b*, 112*d*, 112*g* and 112*i*. The processor causes the display device 30 to display the player's complete hand of cards 110*a*, 110*b*, 112*d*, 112*g* and 112*i* in the order the player arranged them as illustrated in FIG. 6C. The processor determines whether the player's complete hand of cards 110*a*, 110*b*, 112*d*, 112*g* and 112*i* includes a predetermined winning combination of cards. In this embodiment, the processor 38 determines that the player's complete hand of cards, the Ace of Diamonds 110*a*, the Ten of Diamonds 110*b*, the Jack of Diamonds 112*d*, the King of Diamonds 112*g* and the Queen of Diamonds 112*i* includes a Royal Flush. The processor 38 causes the display device 30 to display the player's complete hand of cards 110*a*, 112*g*, 112*i*, 112*d* and 110*b* in a manner in which the player can easily recognize the Royal Flush as illustrated in FIG. 6D. The processor 38 also causes the display device 30 to indicate to the player that the player's complete hand of cards 110*a*, 112*g*, 112*i*, 112*d* and 110*b* includes a Royal Flush.

Figure 7A:
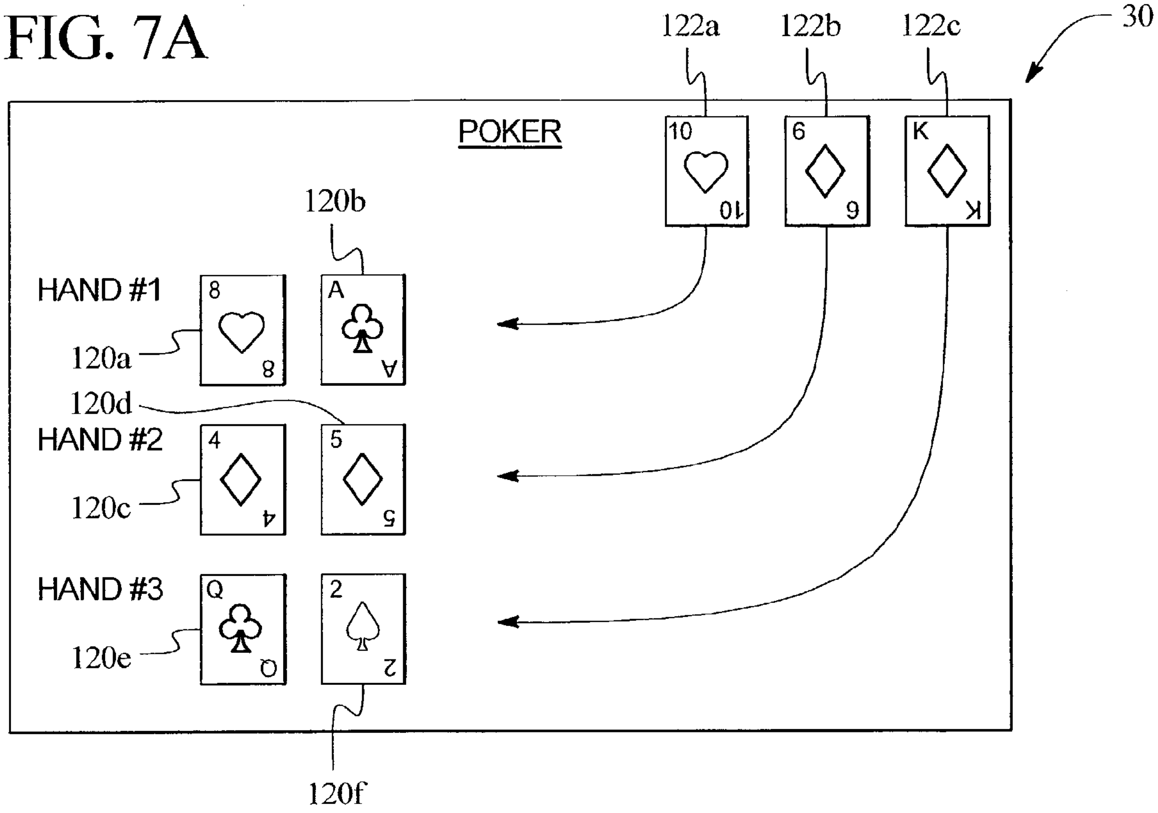
FIG. 7A is an enlarged front elevation view of one of the display devices of FIGS. 1A and 1B illustrating one embodiment of the present invention, wherein in a video poker game the processor adds player-selected cards from a first offer set to a player's plurality of hands of cards.
Figure 7B:
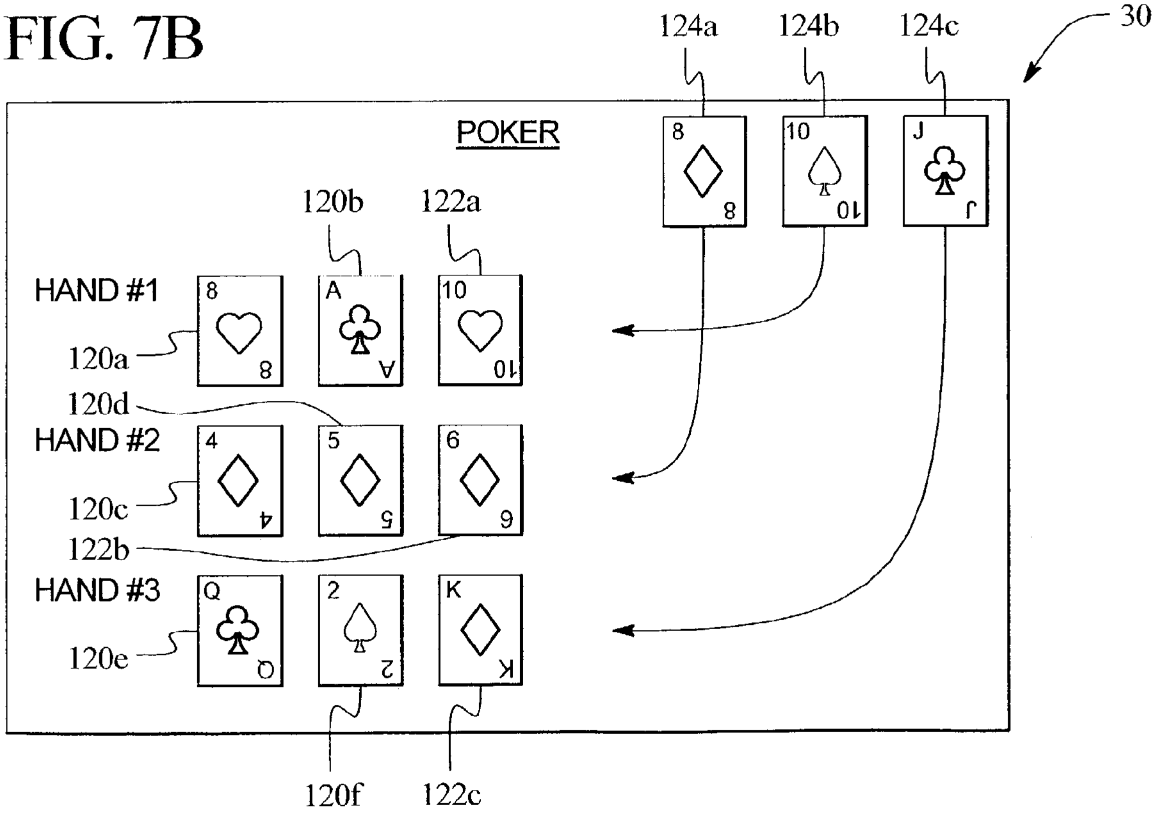
FIG. 7B is a view of the embodiment of the present invention illustrated in FIG. 7A, wherein the processor adds player-selected cards from a second offer set to the player's plurality of hands of cards.

It should be appreciated that the processor 38 can offer the player a plurality of offer sets either simultaneously or sequentially from which the player can select a plurality of cards. The processor may offer a new offer set after each of a plurality of predetermined gaming events or may offer the player a plurality of offer sets from which to choose from. In one embodiment of the present invention, the game being played on the gaming device 10 is a video poker game and the plurality of interactive player-selectable symbols includes gaming cards from one or more card decks. The processor 38 determines, provides and displays (face-up) to the player a plurality of initial cards 120*a*, 120*b*, 120*c*, 120*d*, 120*e* and 120*f* in a plurality of hands as illustrated in FIG. 7A. Each of the plurality of hands includes two initial cards. In this embodiment of video poker, a complete poker hand includes five cards. Hand No. 1 initially includes an Eight of Hearts 120*a* and an Ace of Clubs 120*b*. Hand No. 2 initially includes a Four of Diamonds 120*c* and a Five of Diamonds 120*d*. Hand No. 3 initially includes a Queen of Clubs 120*e* and a Two of Spades 120*f*. The processor 38 determines and offers to the player a first offer set of cards 122*a*, 122*b* and 122*c*. The processor 38 enables the player to select the cards 122*a*, 122*b* and 122*c* from the first offer set and place the selected cards into any hand the player chooses. In this embodiment of the present invention, the player selects the Ten of Hearts 122*a* to be added to the initial cards 120*a* and 120*b* in Hand No. 1. The player selects the Six of Diamonds 122*b* to be added to initial cards 120*c* and 120*d* in Hand No. 2. The player selects the King of Diamonds 122*c* to be added to the initial cards 120*e* and 120*f* in Hand No. 3. The processor 38 adds the selected cards 122*a*, 122*b* and 122*c* to the player-chosen hand as illustrated in FIG. 7B. The cards in Hand No. 1 include the Eight of Hearts 120*a*, the Ace of Clubs 120*b* and the Ten of Hearts 122*a*. The cards in Hand No. 2 include the Four of Diamonds 120*c*, the Five of Diamonds 120*d* and the Six of Diamonds 122*b*. The card in Hand No. 3 include the Queen of Clubs 120*e*, the Two of Spades 120*f* and the King of Diamonds 122*c*. As the game progresses, the player will decide what potential winning hands of cards he or she has the best chances of completing and will choose the cards from subsequent offer sets in a manner that gives the player the best chances to complete the winning hands. This form of player decision-making provides new ways in which to entertain players.

Figure 7C:
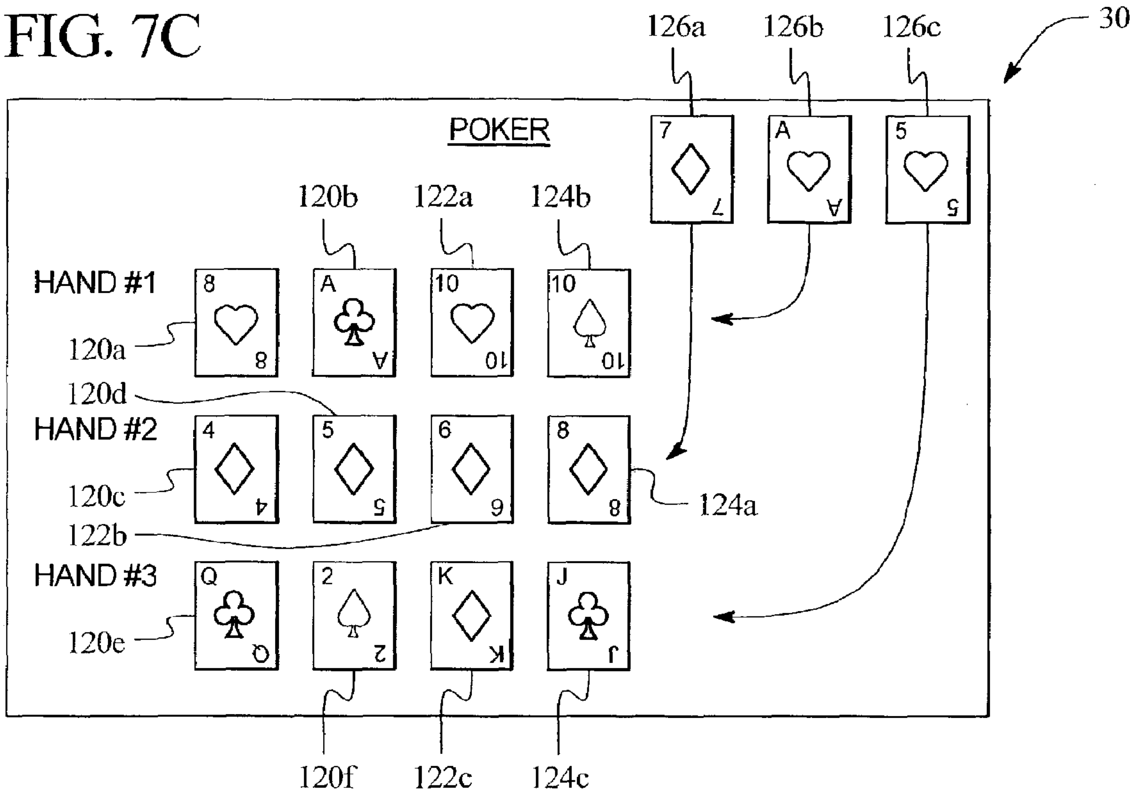
FIG. 7C is a view of the embodiment of the present invention illustrated in FIG. 7A, wherein the processor adds player selected cards from a third offer set to the player's plurality of hands of cards.
Figure 7D:
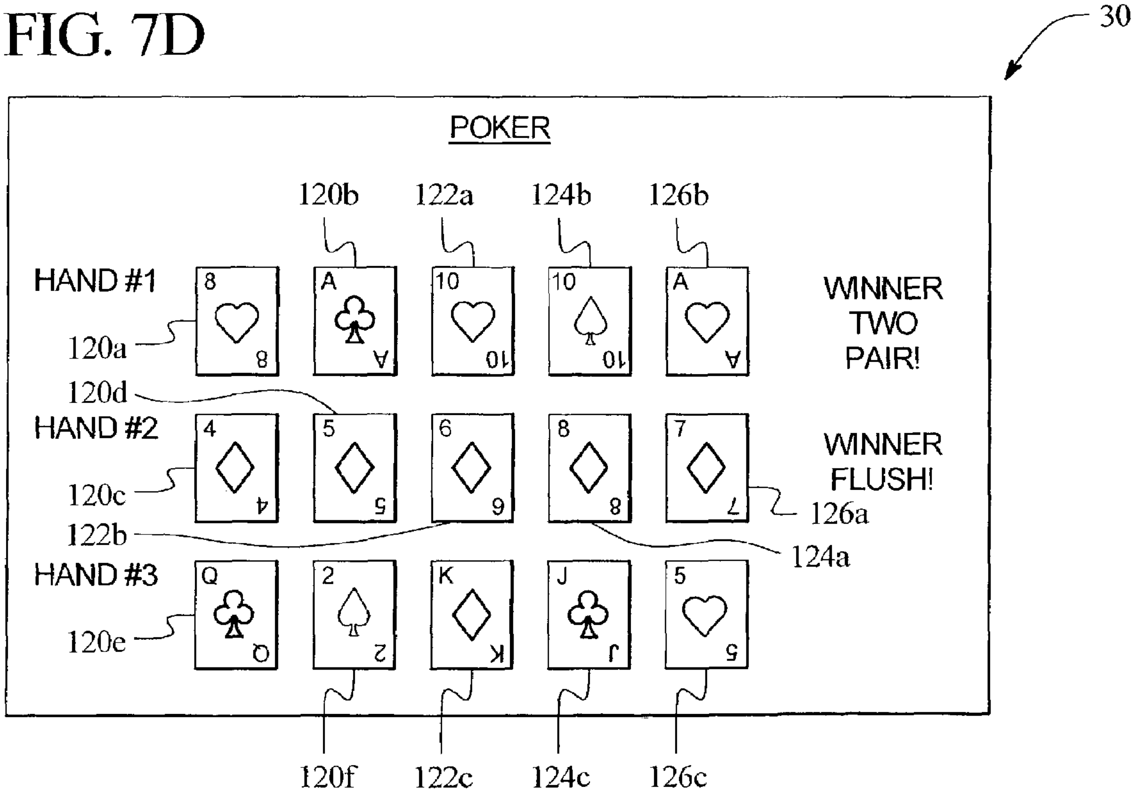
FIG. 7D is a view of the embodiment of the present invention illustrated in FIG. 7A, wherein the processor causes the display of the player's completed plurality of hands and indicates that Hand No. 1 forms Two Pair and Hand No. 2 forms a Flush.

As illustrated in FIG. 7B, the processor 38 determines and offers to the player a second offer set of cards 124*a*, 124*b* and 124*c* from which the player may select cards to be added to the player's chosen hands. The processor 38 enables the player to select the cards 124*a*, 124*b* and 124*c* from the second offer set and choose the hands in which to place the selected cards. In this embodiment, the player selects the Ten of Spades 124*b* from the second offer set to be added to the cards 120*a*, 120*b* and 122*a* into Hand No. 1. The player selects the Eight of Diamonds 124*a* from the second offer set to be added to the cards 120*c*, 120*d* and 122*b* in Hand No. 2. The player selects the Jack of Clubs 124*c* from the second offer set to be added to the cards 120*e*, 120*f* and 122*c* in Hand No. 3. The processor 38 adds the player-selected cards 124*a*, 124*b* and 124*c* to the player-chosen hands as illustrated in FIG. 7C. As illustrated in FIG. 7C, the processor 38 determines and offers a third offer set of cards 126*a*, 126*b* and 126*c* from which the player may select cards to be added to the player's chosen hands. The processor 38 enables the player to select the cards 126*a*, 126*b* and 126*c* to be added to the player's hands. In this embodiment, the player selects the Seven of Diamonds 126*a* from the third offer set to be added to Hand No. 2. The player selects the Ace of Hearts 126*b* from the third offer set to be added to Hand No. 1. The player selects the Five of Hearts 126*c* from the third offer set to be added to Hand No. 3. The processor 38 adds the selected cards 126*a*, 126*b* and 126*c* from the third offer set to the player-chosen hands. The processor 38 causes the display device 30 to display each of the player's complete hands as illustrated in FIG. 7D.

The processor 38 determines whether each of the player's hands includes a predetermined winning combination of cards. In this embodiment, the cards, the Eight of Hearts 120*a*, the Ace of Clubs 120*b*, the Ten of Hearts 122*a*, the Ten of Spades 124*b* and the Ace of Hearts 126*b*, in Hand No. 1 include a Two Pair. The cards, Four of Diamonds 120*c*, the Five of Diamonds 120*d*, the Six of Diamonds 122*b*, the Eight of Diamonds 124*a* and the Seven of Diamonds 126*a*, Hand No. 2 include a Flush. The processor 38 causes the display device 30 to indicate to the player that Hand No. 1 and Hand No. 2 include winning combinations of cards. The processor 38 provides an award to the player for the winning combinations of cards in the two hands. The present invention provides new and exciting games using the plurality of player selectable symbols. Accordingly, it should be appreciated that the player's selections and assignments from each set for each hand determines the outcomes for the hands.

It should be appreciated that the processor 38 in an alternative embodiment can enable the player to deselect the player-selected cards from the offer sets in the player's hands after the cards have been added to the player's hands of cards from the offer sets, and reselect cards from the offer sets to replace the deselected cards.

It should be appreciated that the processor 38 can determine which cards are in the offer sets and the initial cards in the player's hands using one or more decks of cards. It should be appreciated that a winning combination of cards in such alternative embodiment of the present invention could include two or more identical cards.

Figure 8A:
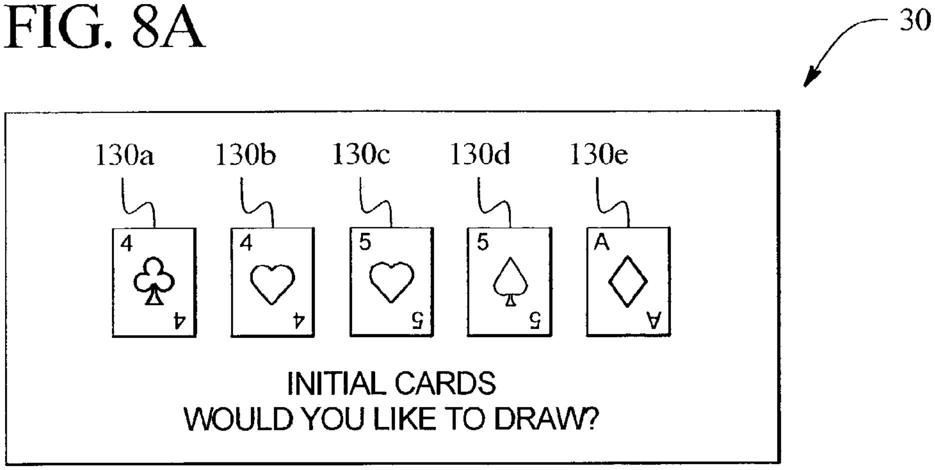
FIG. 8A is an enlarged front elevation view of one of the display devices of FIGS. 1A and 1B illustrating one embodiment of the present invention, wherein in a video poker game the processor provides the player with a hand of initial cards and offers the player a draw.
Figure 8B:
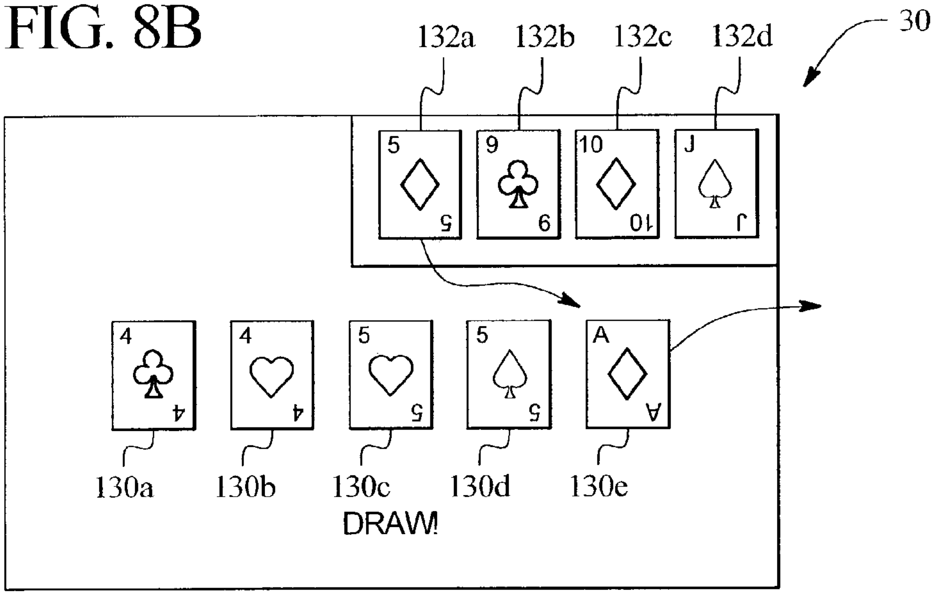
FIG. 8B is a view of the embodiment of the present invention illustrated in FIG. 8A, wherein the processor offers to the player the offer set of cards, adds the player-selected card from the offer set to the player's hand of cards, and discards the player-selected card from the player's hand of cards.
Figure 8C:
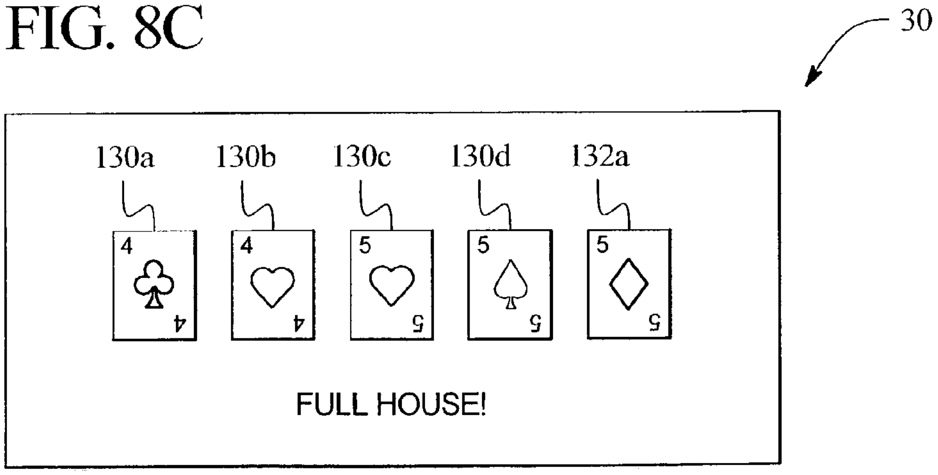
FIG. 8C is a view of the embodiment of the present invention illustrated in FIG. 8A, wherein the processor causes the display of the hand with the final cards and indicates to the player that the player's hand forms a Full House.

In one embodiment of the present invention, the game being played on the gaming device 10 is a video poker game and the plurality of interactive player-selectable symbols includes gaming cards from one or more card decks. The processor 38 determines, provides and displays (face-up) a plurality of initial cards 130*a*, 130*b*, 130*c*, 130*d* and 130*e* to a player as illustrated in FIG. 8A. In this embodiment, the processor 38 provides a complete poker hand of initial cards 130*a*, 130*b*, 130*c*, 130*d* and 130*e*. The processor enables the player to request a draw. In this embodiment the player requests the draw and the processor determines and offers a plurality of cards 132*a*, 132*b*, 132*c* and 132*d* in an offer set as illustrated in FIG. 8B. The processor enables the player to select one or more of the cards from the offer set to replace one or more of the cards in the player's hand. In this embodiment, the player selects the Five of Diamonds 132*a* from the offer set to replace the Ace of Diamonds 130*e* in the player's hand. The processor 38 discards the Ace of Diamonds 130*e* and adds the Five of Diamonds 132*a* to the player's hand. The processor causes the display device 30 to display the cards 130*a*, 130*b*, 130*c*, 130*d* and 132*a* in the player's hand after the draw as illustrated in FIG. 8C. The processor 38 determines if the cards 130*a*, 130*b*, 130*c*, 130*d* and 132*a* in the player's hand after the draw includes a winning combination of cards. In this embodiment, the cards, the Four of Clubs 130*a*, the Four of Hearts 130*b*, the Five of Hearts 130*c*, the Five of Spades 130*d* and the Five of Diamonds 132*a* in the player's hand includes a Full House. The processor 38 causes the display device 30 to indicate to the player that the player's hand includes a Full House and provides an award to the player for the winning combination of cards.

Figure 9A:
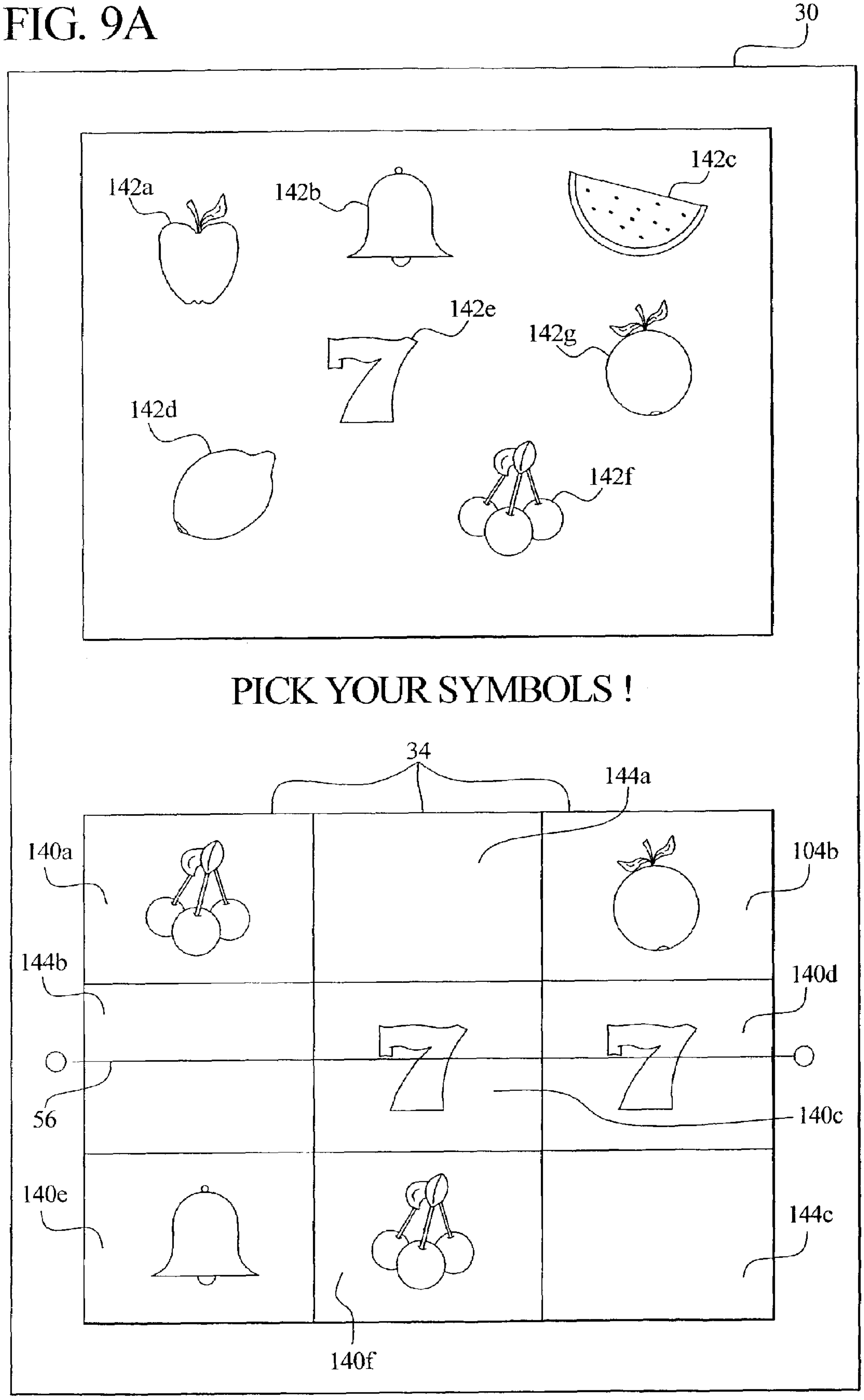
FIG. 9A is an enlarged front elevation view of one of the display devices of FIGS. 1A and 1B illustrating one embodiment of the present invention, wherein in a video slot game the processor generates and causes the display of a plurality of symbols and blank spaces on a plurality of gaming reels, and generates and offers a plurality of symbols in an offer set to a player.

As previously discussed, the present invention can be used in wagering games other than video poker. In one embodiment of the present invention, the game being played on the gaming device 10 is a video slot game and the interactive player-selectable symbols are symbols which are identical to the symbols displayed by the plurality of gaming reels 34 included in the gaming device 10 as illustrated by FIG. 9A. In one embodiment, the processor 38 determines and displays a plurality of symbols 140*a*, 140*b*, 140*c*, 140*d*, 140*e* and 140*f* on a plurality of reels 34. In this embodiment, the processor 38 additionally determines and displays a plurality of blank positions 144*a*, 144*b* and 144*c* on the plurality of reels 34. The positioning of the blank positions is randomly determined by the processor. It should be understood that the displayed symbols can also be randomly determined.

Figure 9B:
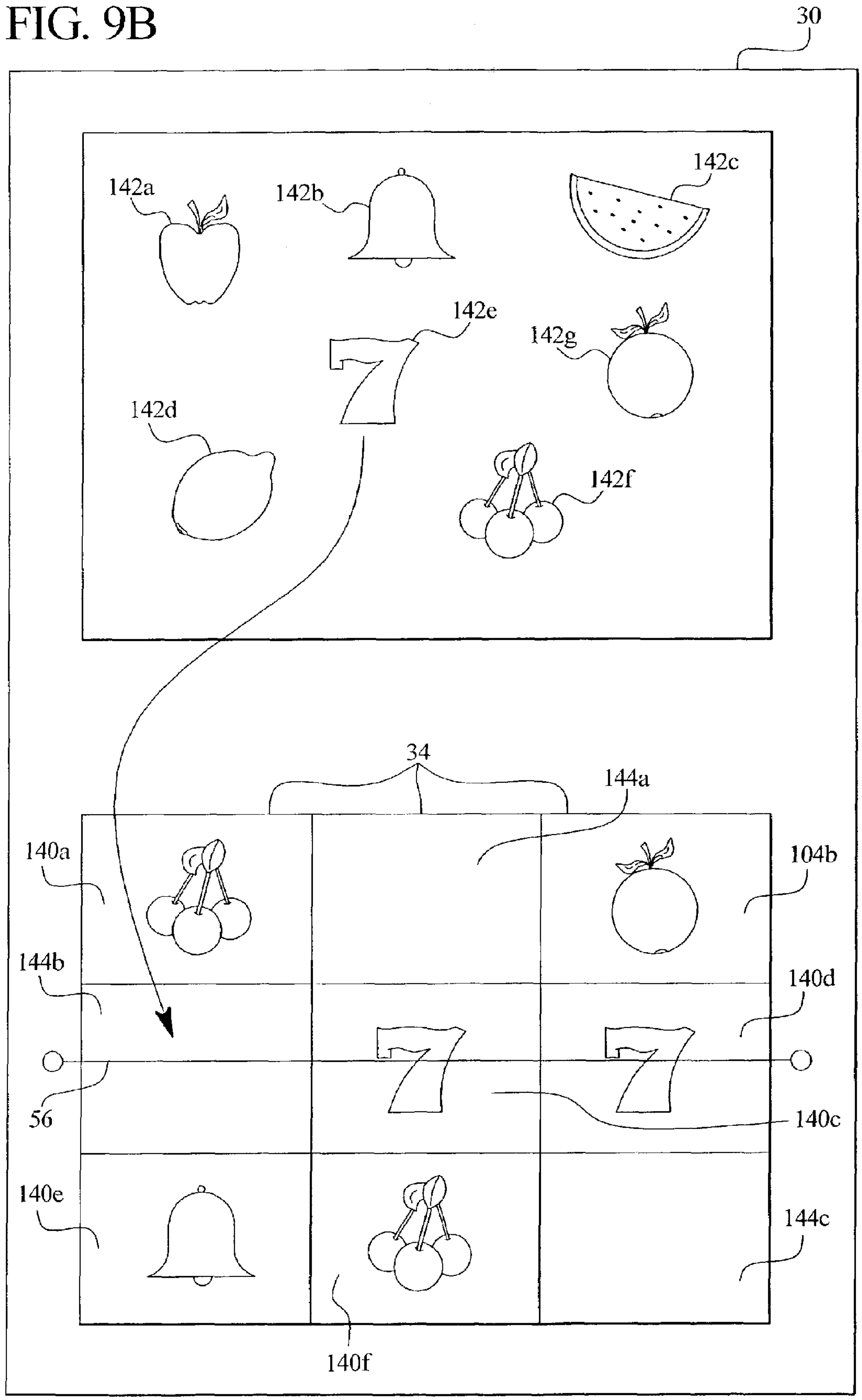
FIG. 9B is a view of the embodiment of the present invention illustrated in FIG. 9A, wherein the processor adds the player-selected symbol from the offer set to the plurality of symbols displayed by the plurality of gaming reels.
Figure 9C:
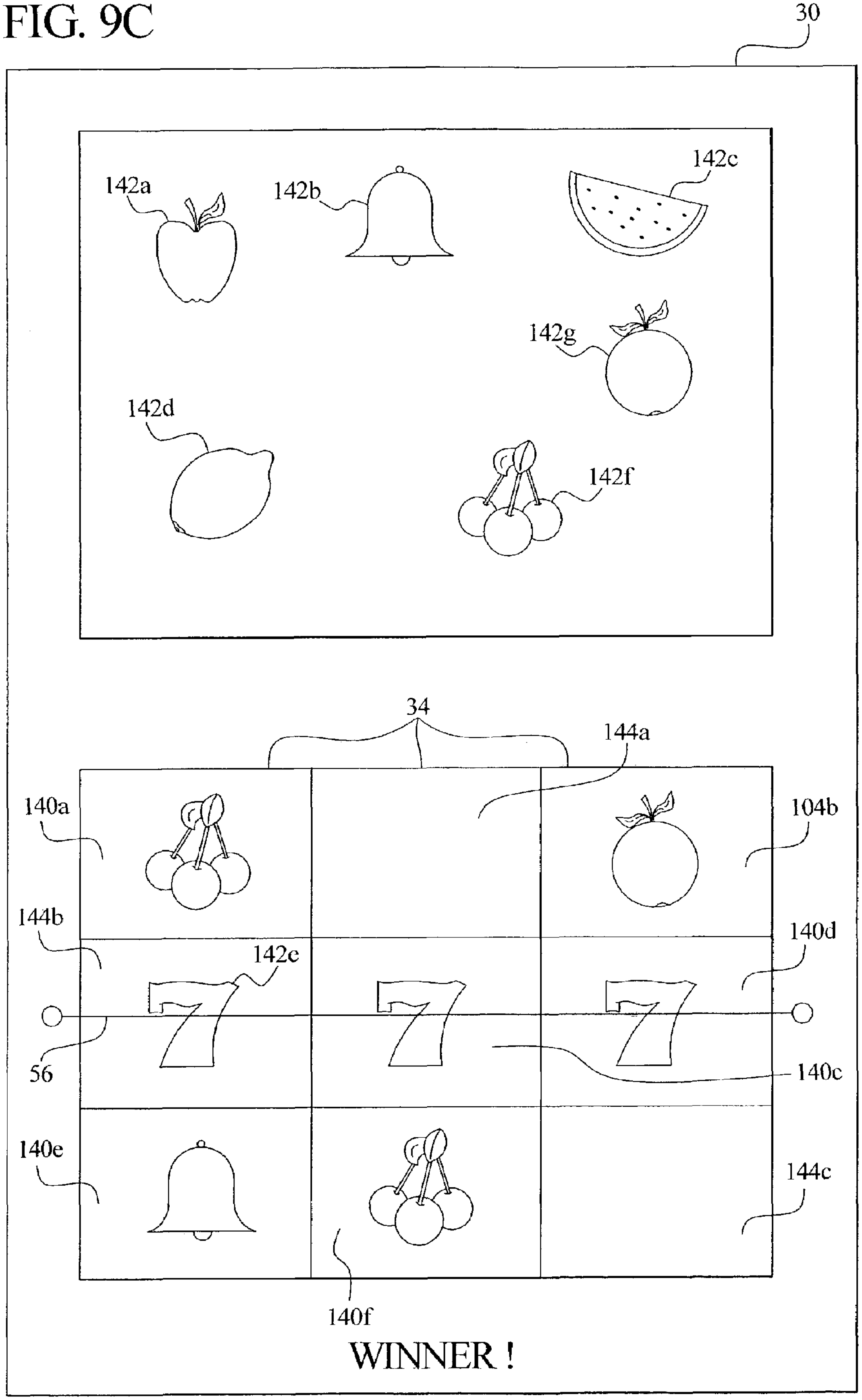
FIG. 9C is a view of the embodiment of the present invention illustrated in FIG. 9A, wherein the processor indicates to the player that the player has won an award.

In this embodiment, the processor 38 determines and offers a plurality of symbols 142*a*, 142*b*, 142*c* 142*d*, 142*e*, 142*f* and 142*g* in an offer set to the player. The processor 38 enables the player to select one or more symbols 142*a*, 142*b*, 142*c* 142*d*, 142*e*, 142*f* and 142*g* from the offer set to be placed in one or more of the blank positions 144*a*, 144*b* and 144*c* displayed by the plurality of reels 34. In this embodiment, the player selects one symbol 142*e* to be placed into one of the blank positions 144*b* displayed by the plurality of reels 34. The processor adds the player-selected symbol 142*e* to the player-chosen 144*b* blank position on the plurality of reels 34 as illustrated by FIG. 9B. The processor 38 causes the display device 30 to display the plurality of reels 34 including the player-selected symbol 142*e* in the player-chosen blank position 144*b*. The processor 38 determines if any combination of symbols on a payline includes a winning combination of symbols. In this embodiment, the processor determines that the three Sevens 142*e*, 140*e* and 140*d* are on a payline 56 and include a winning combination of symbols. The processor 38 provides an award to the player for the winning combination of symbols.

In an alternative embodiment of the present invention where the processor 38 determines and displays a plurality of symbols on a plurality of reels in a video slot machine, there are no blank positions displayed by the plurality of reels. In this alternative embodiment, the processor 38 enables the player to choose symbols on the plurality of reels to be replaced by the player-selected symbols from one or more offer sets of symbols. The processor 38 replaces the discarded symbols on the plurality of reels by player-selected symbols from the offer sets of symbols.

Figure 10A:
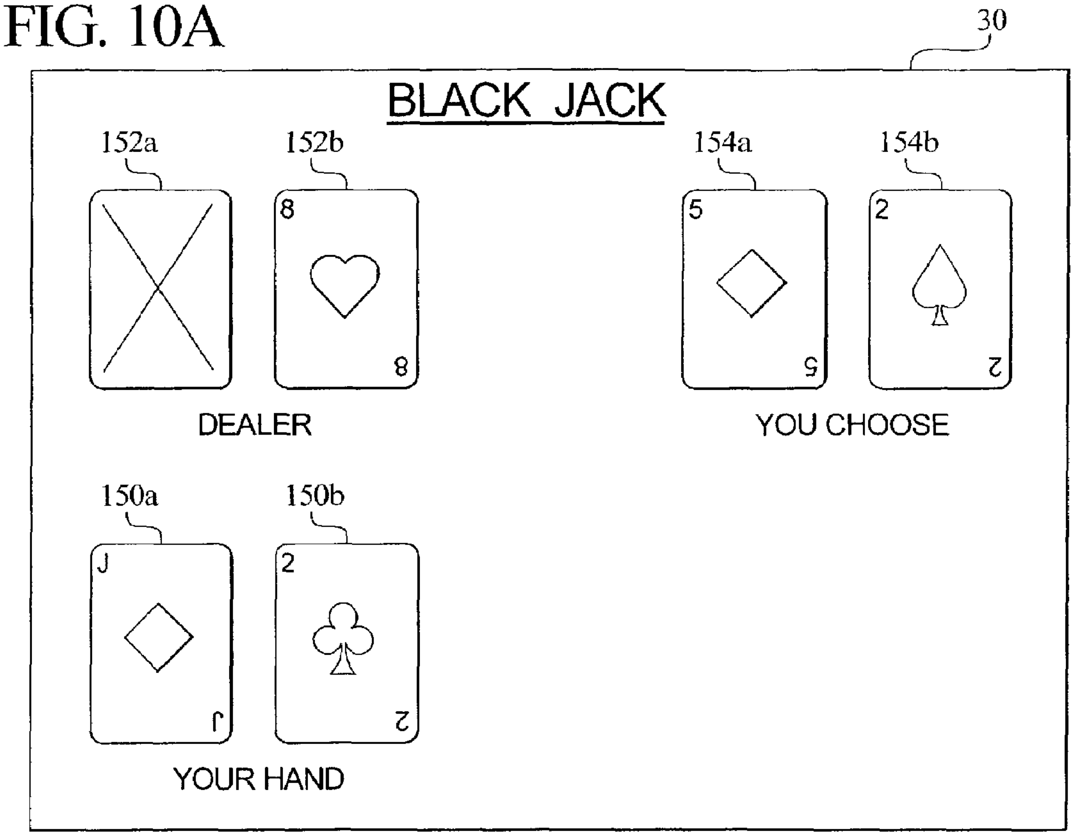
FIG. 10A is an enlarged front elevation view of one of the display devices of FIGS. 1A and 1B illustrating one embodiment of the present invention, wherein in a video blackjack game, the processor provides the player with a hand of cards, the dealer with a hand of cards and offers the player a first offer set of cards.
Figure 10B:
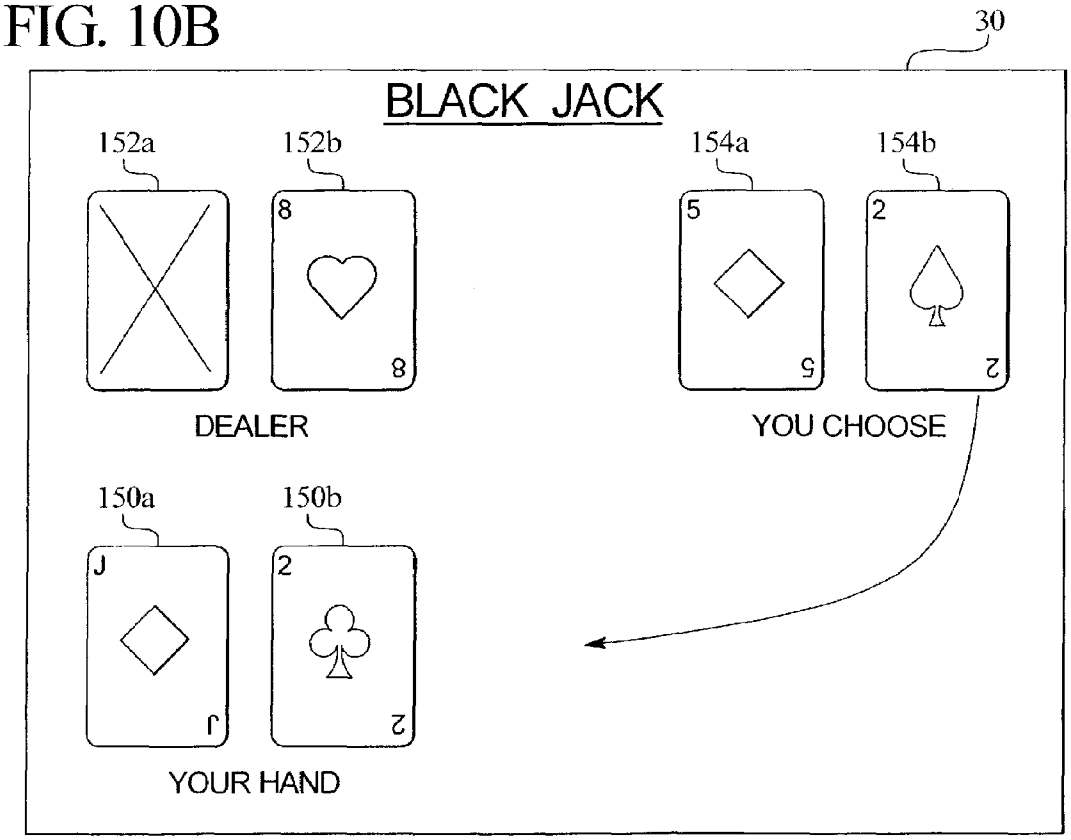
FIG. 10B is a view of the embodiment of the present invention illustrated in FIG. 10A, wherein in the video blackjack game, the processor adds the player-selected card from the first offer set to the player's hand of cards.
Figure 10C:
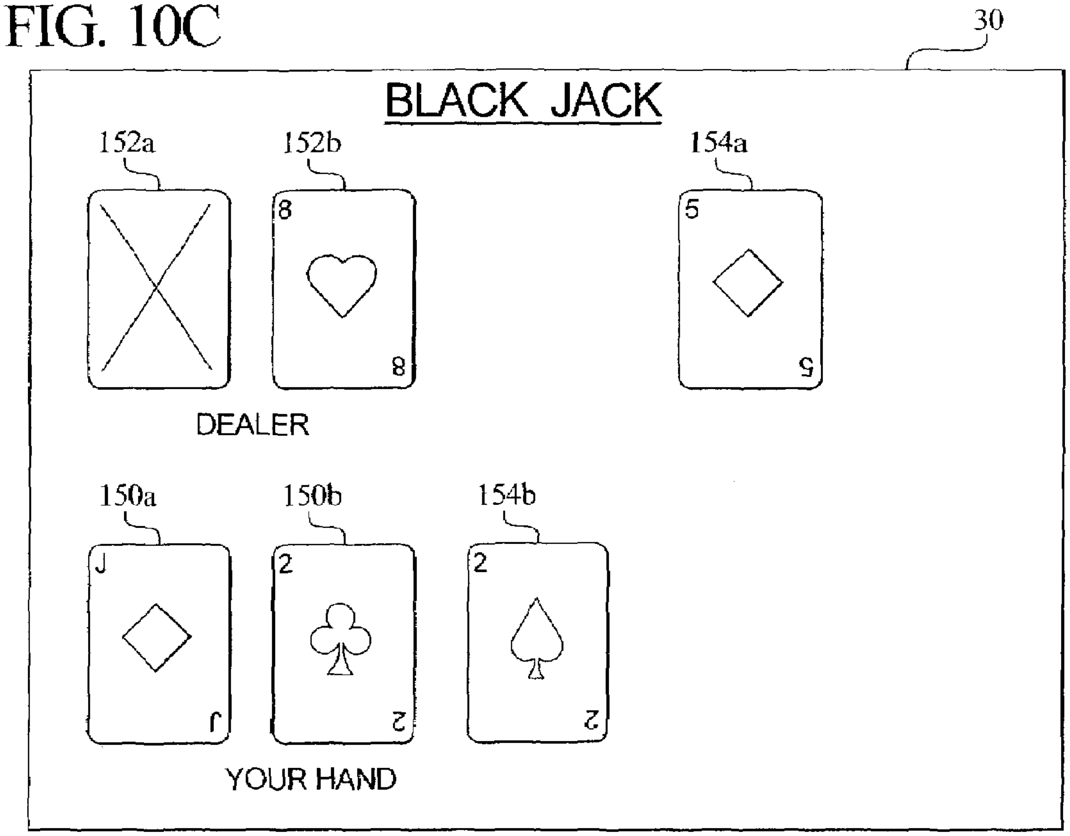
FIG. 10C is a view of the embodiment of the present invention illustrated in FIG. 10A, wherein in the video blackjack game, the processor causes the display device to display the player's hand of cards which includes the player-selected card from the first offer set.
Figure 10D:
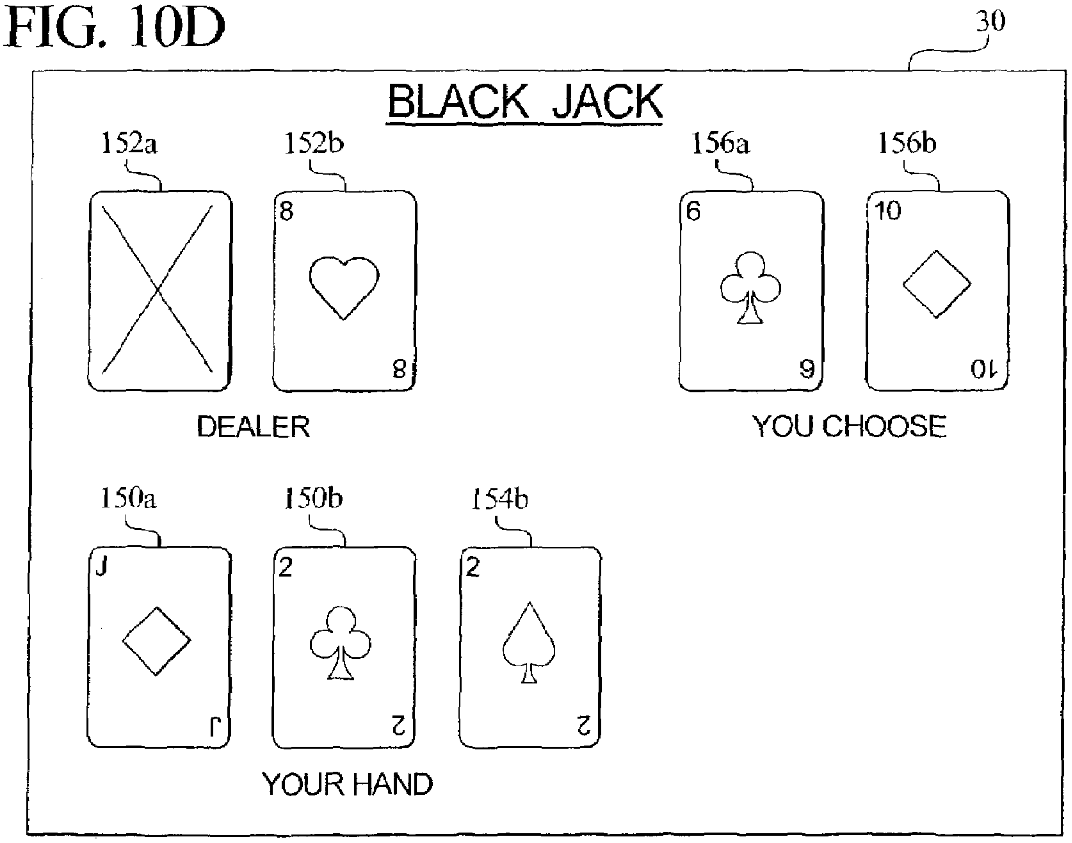
FIG. 10D is a view of the embodiment of the present invention illustrated in FIG. 10A, wherein in the video blackjack game, the processor provides the player with a second offer set.
Figure 10E:
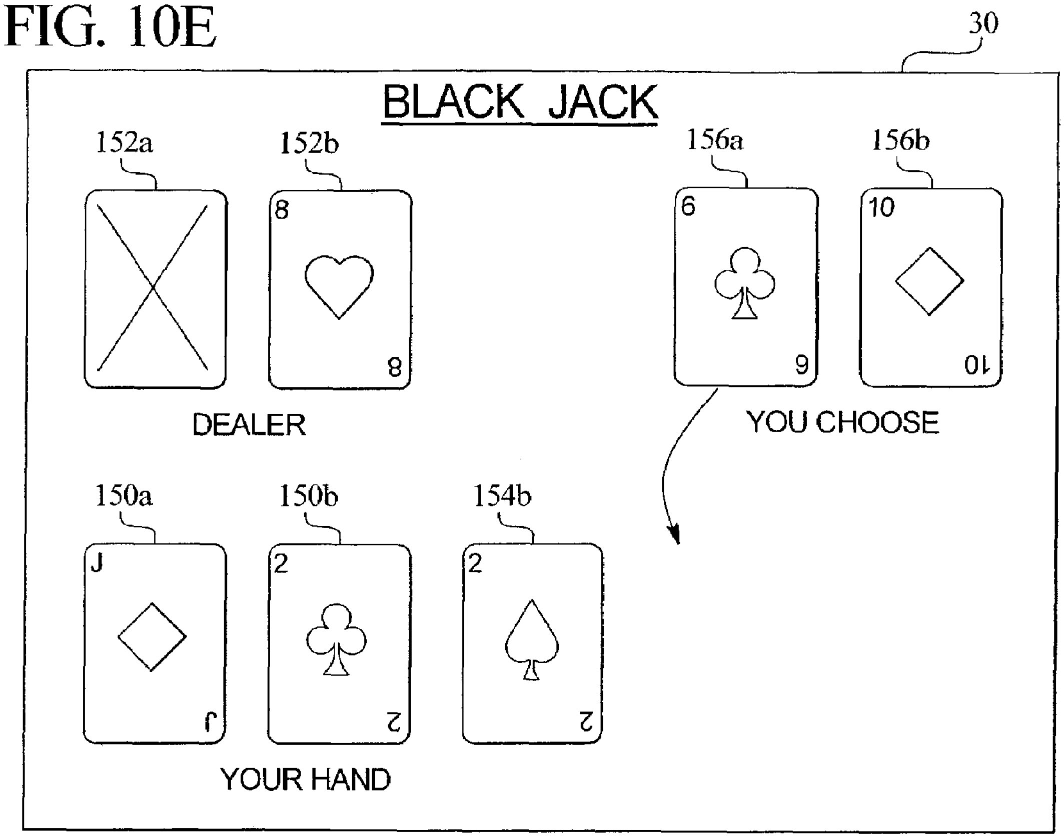
FIG. 10E is a view of the embodiment of the present invention illustrated in FIG. 10A, wherein in the video blackjack game, the processor adds the player-selected card from the second offer set to the player's hand of cards.
Figure 10F:
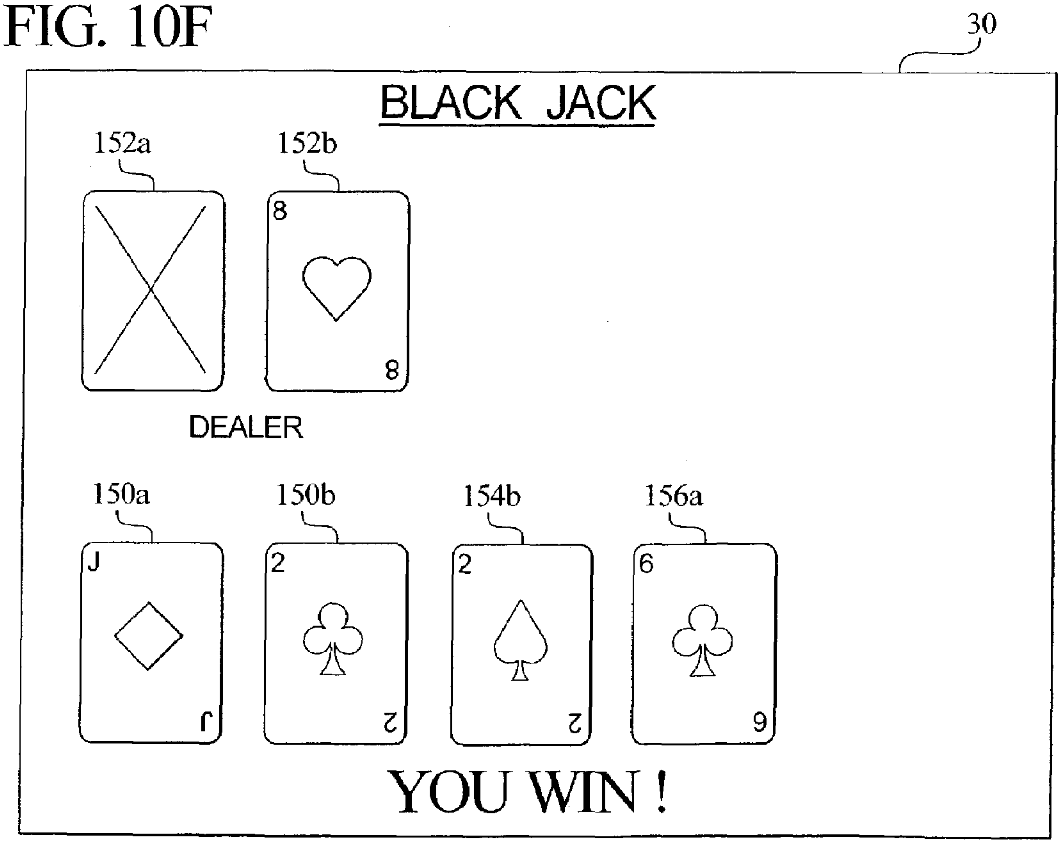
FIG. 10F is a view of the embodiment of the present invention illustrated in FIG. 10A, wherein in the video blackjack game, the processor causes the display device to display the dealer's hand and the player's hand including the cards from the offer sets, and indicate to the player that the player has won.

In one embodiment of the present invention, the game which is played on the gaming device 10 is a video blackjack game, and the plurality of interactive player-selectable symbols include cards from a deck or decks of gaming cards. In one embodiment of the present invention, the processor 38 determines and provides a plurality of cards 150*a* and 150*b* to the player as illustrated in FIG. 10A. The processor 38 determines and provides a plurality of cards 152*a* and 152*b* to the gaming device or "dealer." The processor 38 causes the display device 30 to display the cards 150*a* and 150*b* in the player's hand and to display one card 152*b* in the dealer's hand. The processor 38 enables the player to request a "hit" or to have a card added to the player's initial cards or hand. In this embodiment, the player requests a hit and the processor determines and offers a plurality of cards in a first offer set to the player. The player selects a card 154*b* from the first offer set to be added to the player's hand. The processor 38 adds the player-selected card 154*b* to the player's hand as illustrated by FIG. 10B. The processor 38 causes the display device to display the cards 150*a*, 150*b* and 154*b* in the players hand including the player-selected card 154*b* from the first offer set as illustrated in FIG. 10C. In this embodiment, the player requests another hit and the processor 38 determines and offers a plurality of cards 156*a* and 156*b* in a second offer set as illustrated in FIG. 10D. The player selects a card 156*a* from the second offer set to be added to the cards 150*a*, 150*b* and 154*b* in the player's hand. The processor 38 adds the player-selected card 156*a* to the player's hand. The processor 38 causes the display device 30 to display the cards 150*a*, 150*b*, 154*b* and 156*a* in the player's hand as illustrated in FIG. 10F. In this embodiment, the player decides to "stand" after two hits. The processor causes the display device 30 to display the cards 152*a* and 152*b* in the dealer's hand and determines whether to add a card to the dealer's hand. In this embodiment, the processor has made the determination to stand and does not add a card to the dealer's hand. The processor 38 determines whether the total value of the cards, the Jack of Diamonds 150*a*, the Two of Clubs 150*b*, the Two of Spades 154*b* and the Six of Clubs 156*a*, in the player's hand are greater than the total value of the cards, the Queen of Spades 152*a* and the Eight of Hearts 152*b*, in the dealer's hand but not greater than twenty-one. In this embodiment, the total value of the cards 150*a*, 150*b*, 154*b* and 156*a* in the player's hand is twenty and the total value of the cards 152*a* and 152*b* in the dealer's hand is eighteen. The processor 38 provides an award to the player for having the winning hand.

It should be appreciated that the processor 38 can enable the player to pick more than one card from the plurality of cards in an offer set.

Figure 11A:
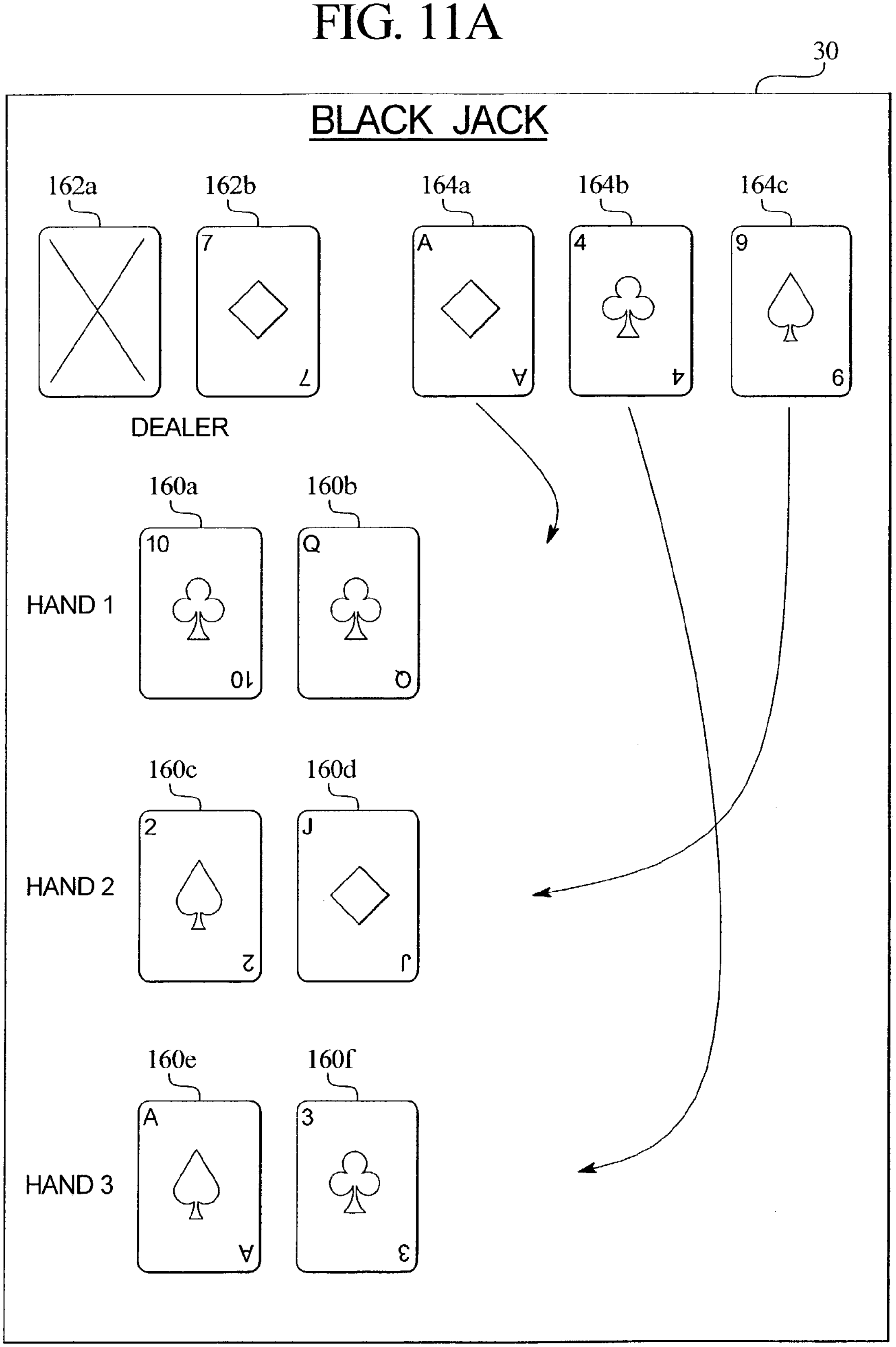
FIG. 11A is an enlarged front elevation view of one of the display devices of FIGS. 1A and 1B illustrating one embodiment of the present invention, wherein in a video blackjack game, the processor provides the player with a plurality of hands of cards, the dealer with a hand of cards and an first offer set of cards, and adds the player-selected cards from the first offer set of cards to the players plurality of hands.
Figure 11B:
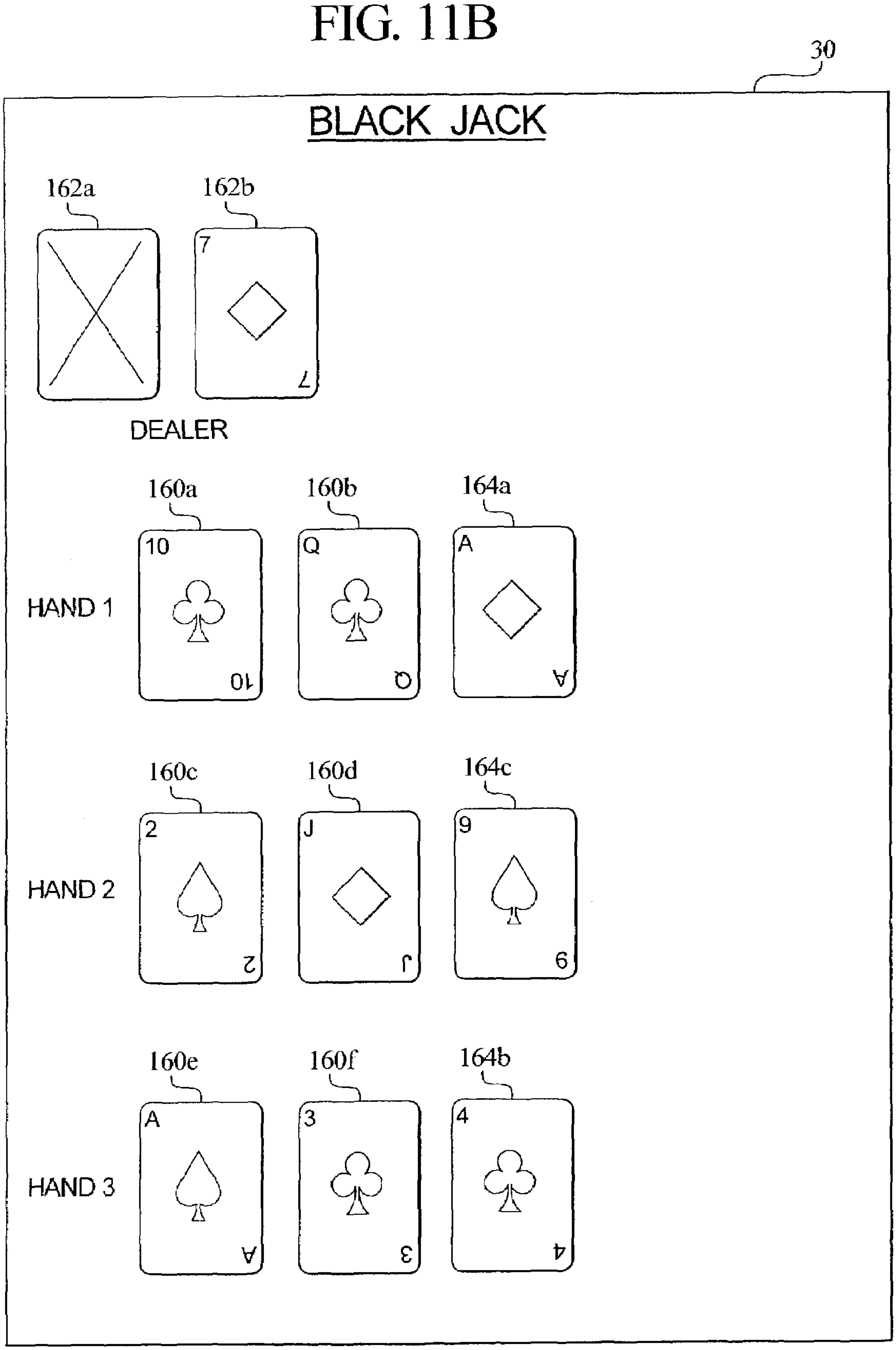
FIG. 11B is a view of the embodiment of the present invention illustrated in FIG. 11A, wherein in the video blackjack game, the processor causes the display device to display the player's plurality of hands of cards which include the player-selected cards from the first offer set.
Figure 11C:
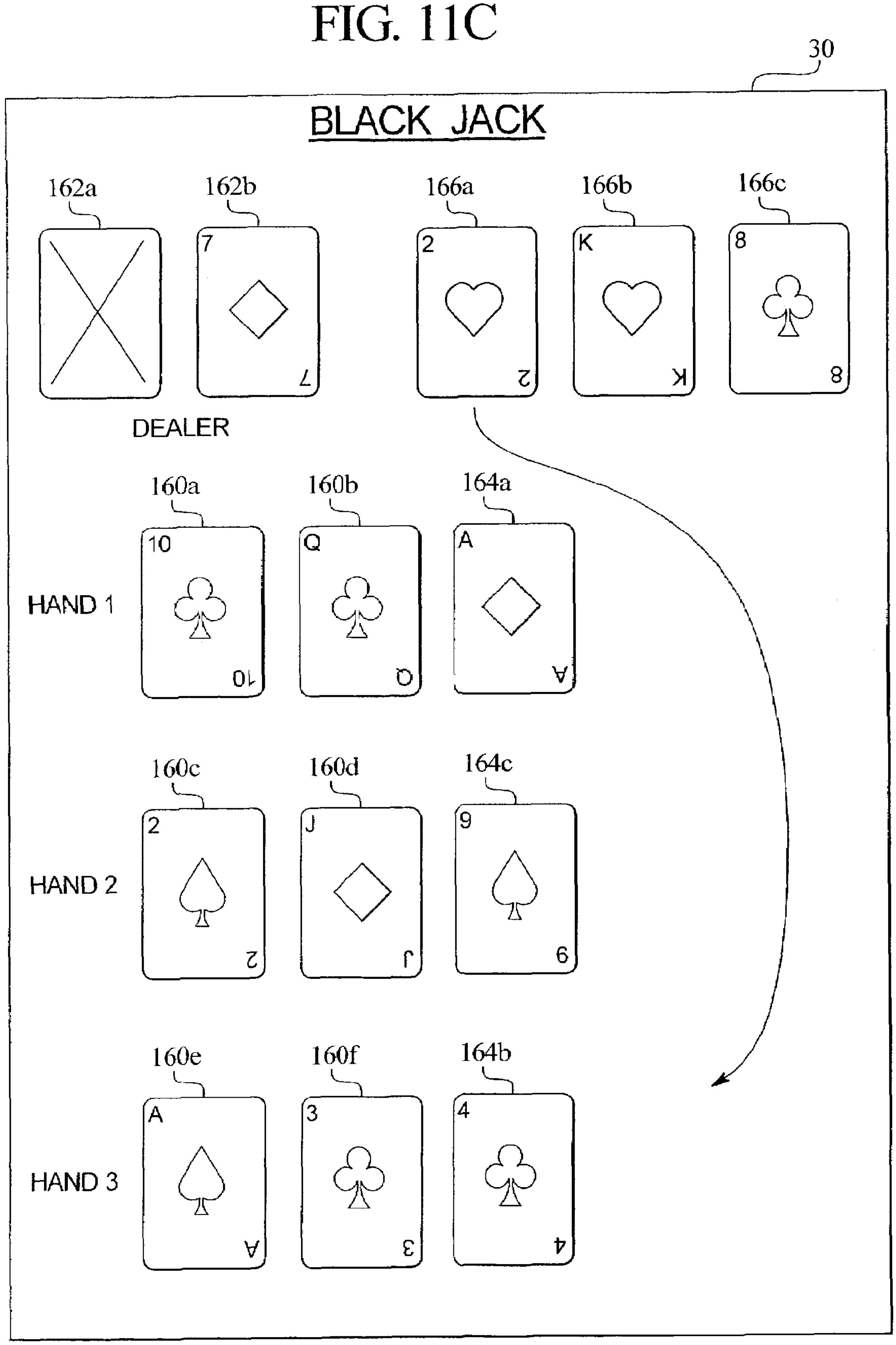
FIG. 11C is a view of the embodiment of the present invention illustrated in FIG. 11A, wherein in the video blackjack game, the processor adds the player-selected card from a second offer set of cards to one of the player's plurality of hands of cards.
Figure 11D:
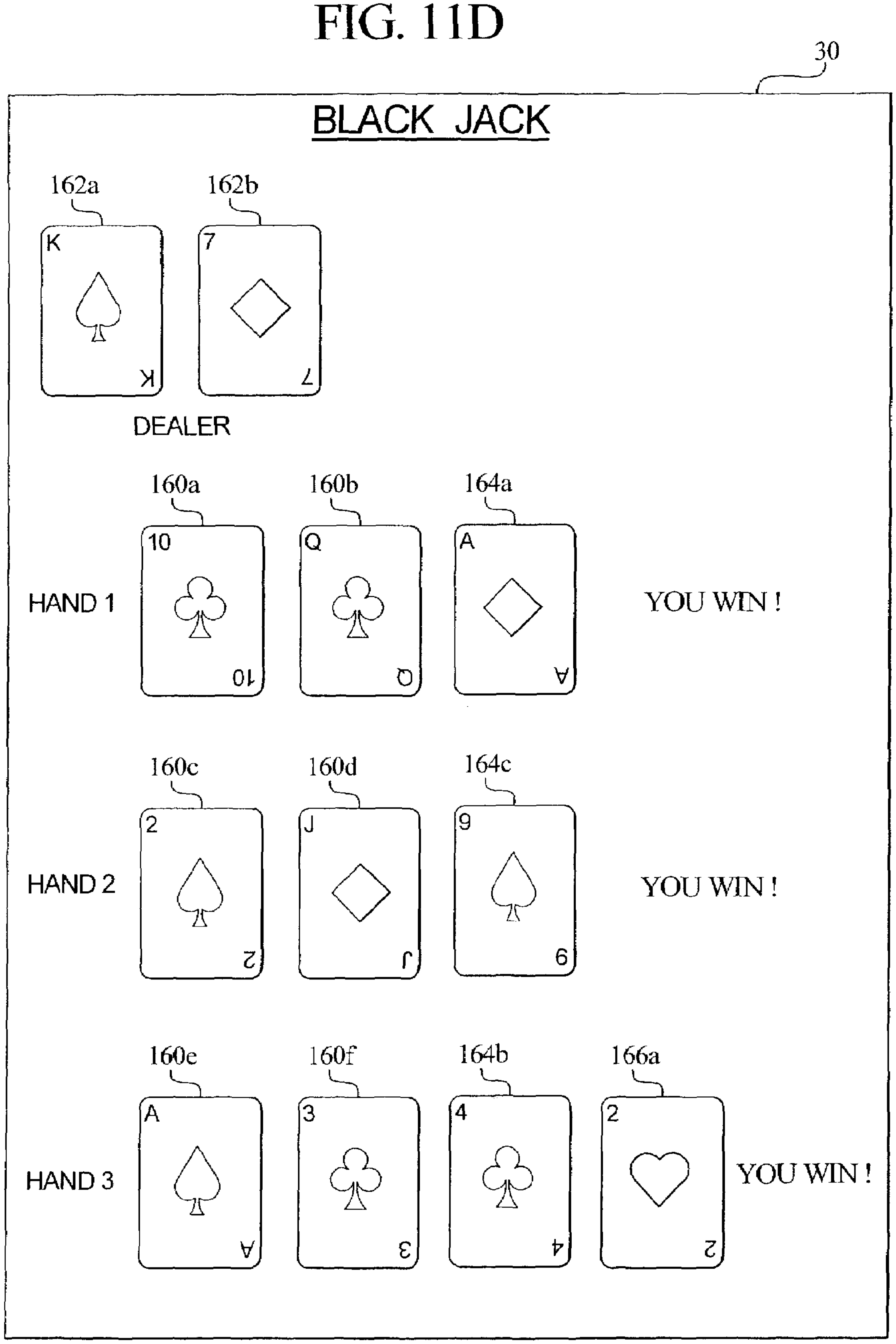
FIG. 11D is a view of the embodiment of the present invention illustrated in FIG. 11A, wherein in the video blackjack game, the processor causes the display device to display the player's plurality of hands of cards which include the player-selected cards from the offer sets, and indicate to the player which of the player's plurality of hands have won.

In another embodiment of the present invention, the processor 38 determines and provides to the player a plurality of cards 160*a*, 160*b*, 160*c*, 160*d*, 160*e* and 160*f* in a plurality of hands in a video blackjack game as illustrated in FIG. 11A. The processor 38 determines and provides a plurality of cards 162*a* and 162*b* to the dealer. The processor 38 causes the display device 30 to reveal one card 162*b* in the dealer's hand. In this embodiment, the player requests a hit and the processor 38 determines and offers the player a plurality of cards 164*a*, 164*b* and 164*c* in a first offer set. The processor 38 enables the player to select one or more of the cards 164*a*, 164*b* and 164*c* to be added to one or more of the plurality of the player's hands. In this embodiment, the player selects the Ace of Diamonds 164*a* to be added to Hand No. 1, the Four of Clubs 164*b* to be added to Hand No. 3 and the Nine of Spades 164*c* to be added to Hand No. 2. The processor 38 adds the player-selected cards 164*a*, 164*b* and 164*c* to the player's plurality of hands. The processor 38 causes the display device 10 to display the player's plurality of hands including the cards 164*a*, 164*b* and 164*c* from the first offer set as illustrated in FIG. 11A. In this embodiment, the player requests a second hit and the processor 38 determines and offers a plurality of cards 166*a*, 166*b* and 166*c* in a second offer set to the player as illustrated in FIG. 11C. The player selects one of the cards, the Two of Hearts 166*a*, from the second offer set to be added to Hand No. 3. It should be appreciated that in one embodiment, if the player requests a second hit, the player may be required to use, one, a plurality or all of the cards in the second set.

In this example, the player does not request a third hit and the processor 38 causes the display device 30 to display the plurality of player's hands. The processor 38 also causes the display device 30 to reveal the cards 162*a* and 162*b* in the dealer's hand of cards. The processor 38 determines whether to hit or stand with the dealer's hand, and in this embodiment, the processor 38 makes a determination to stand. The processor 38 determines if the total value in each of the player's plurality of hands is greater than the total value of the dealer's hand, but not greater than twenty one. The total value of the cards, King of Spades 162*a* and the Seven of Diamonds 162*b* in the dealer's hand is seventeen. The total value of the cards, the Ten of Clubs 160*a*, the Queen of Clubs 160*b* and the Ace of Diamonds 160*a*, in the player's first hand is twenty one. The total value of the cards, the Two of Spades 160*c*, the Jack of Diamonds 160*d* and the Nine of Spades 164*c*, in the player's second hand is also twenty one. The total value of the cards, the Ace of Spades 160*e*, the Jack of Clubs 160*f*, the Four of Clubs 164*b* and the Two of Spades 166*a*, in the player's third hand is nineteen. In this embodiment, each of the player's three hands is a winning hand. The processor 38 provides the player with an award for the player's plurality of winning hands.

Figure 12A:
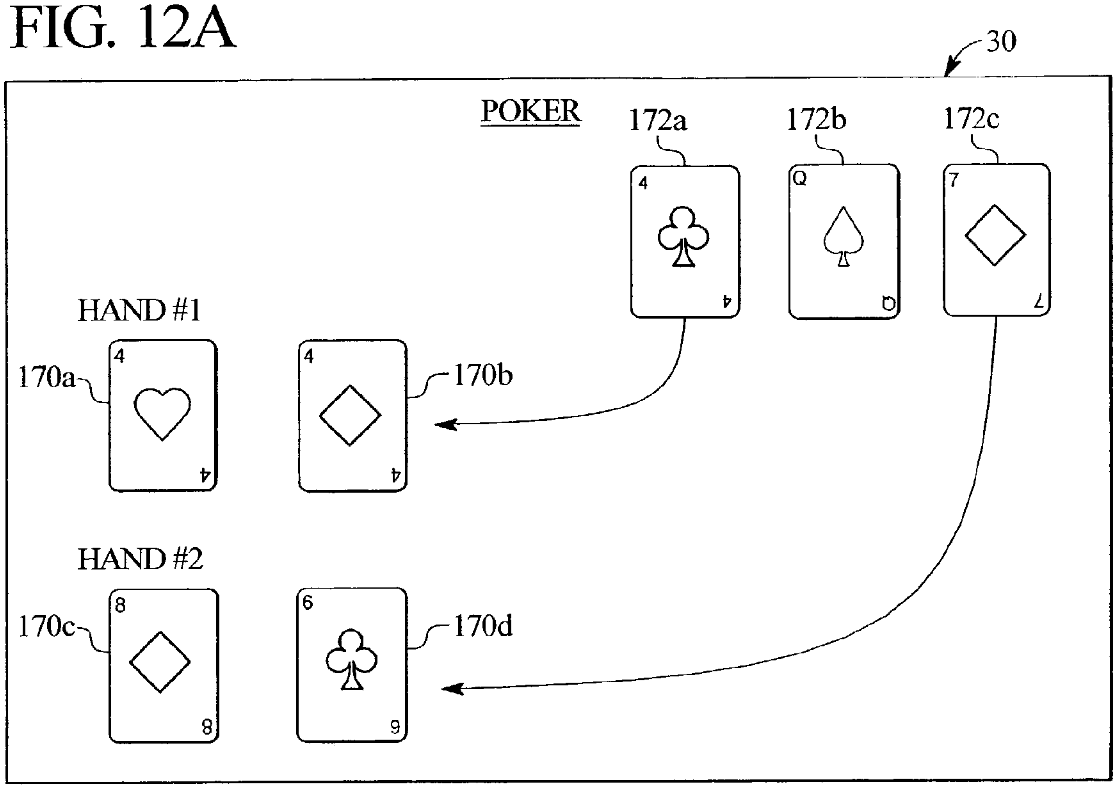
FIG. 12A is an enlarged front elevation view of one of the display devices of FIGS. 1A and 1B illustrating one embodiment of the present invention, wherein in a video poker game the processor adds player-selected cards from a first offer set to a player's plurality of hands of cards.

The present invention provides a game during which the player makes decisions based upon the manner in which the player feels that he or she can achieve a winning combination of symbols. This player decision-making provides the player with excitement and anticipation. For example, in one embodiment of the present invention, the game being played on the gaming device 10 is a video poker game and the plurality of interactive player-selectable symbols includes gaming cards from one or more card decks. The processor 38 determines, provides and displays (face-up) to the player a plurality of initial cards 170*a*, 170*b*, 170*c* and 170*d* in two hands of cards as illustrated in FIG. 12A. Each of the two hands includes two initial cards. In this embodiment of video poker, a complete poker hand includes five cards. Hand No. 1 initially includes a Four of Hearts 170*a* and an Ace of Clubs 170*b*. Hand No. 2 initially includes an Eight of Diamonds 170*c* and a Six of Clubs 170*d*. The processor 38 determines and offers to the player a first offer set of cards 172*a*, 172*b* and 172*c*. In this embodiment, the offer set includes more cards 172*a*, 172*b* and 172*c* than the hands which are provided to the player. The processor 38 enables the player to select one card from the offer set for each hand which was provided to the player.

In this embodiment, the player has a plurality of choices in which to achieve a potential winning combination of cards. If the player elects to place the Four of Clubs 172*a* from the offer set into Hand No. 1, Hand No. 1 will include the Four of Hearts 170*a*, the Four of Diamonds 170*b* and the Four of Clubs 172*a*. This is a winning combination, a Three Of A Kind, and the hand can potentially include a Four Of A Kind if the Four of Spades is included in Hand No. 1 in a subsequent turn. The player can also elect to place the Four of Clubs 172*a* in Hand No. 2, in which case the player has the potential to achieve another winning combination of cards, a Straight. In this embodiment, the award associated with the Four Of A Kind is larger than the award associated with the Straight. The award associated with the Straight, however, is larger than the award associated with the Three Of A Kind. The player has to decide to either place the Four of Clubs 172*a* in Hand No. 1 and have the Three Of A Kind and potentially the Four Of A Kind or place the Four of Clubs 172*a* in Hand No. 2 and potentially obtain the Straight. In this embodiment, the player selects the Four of Clubs 172*a* to be added to the initial cards 170*a* and 170*b* in Hand No. 1. The player, thus, has a Three Of A Kind and may potentially receive a Four Of A Kind in Hand No. 1. The offer set in this embodiment also includes a Seven of Diamonds 172*c* which when placed in Hand No. 2 provides the player with the opportunity to obtain a Straight. The player selects the Seven of Diamonds 172*c* to be added to the initial cards 170*c* and 170*d* in Hand No. 2 and, thus, still has the potential to receive the Straight in Hand No. 2.

Figure 12B:
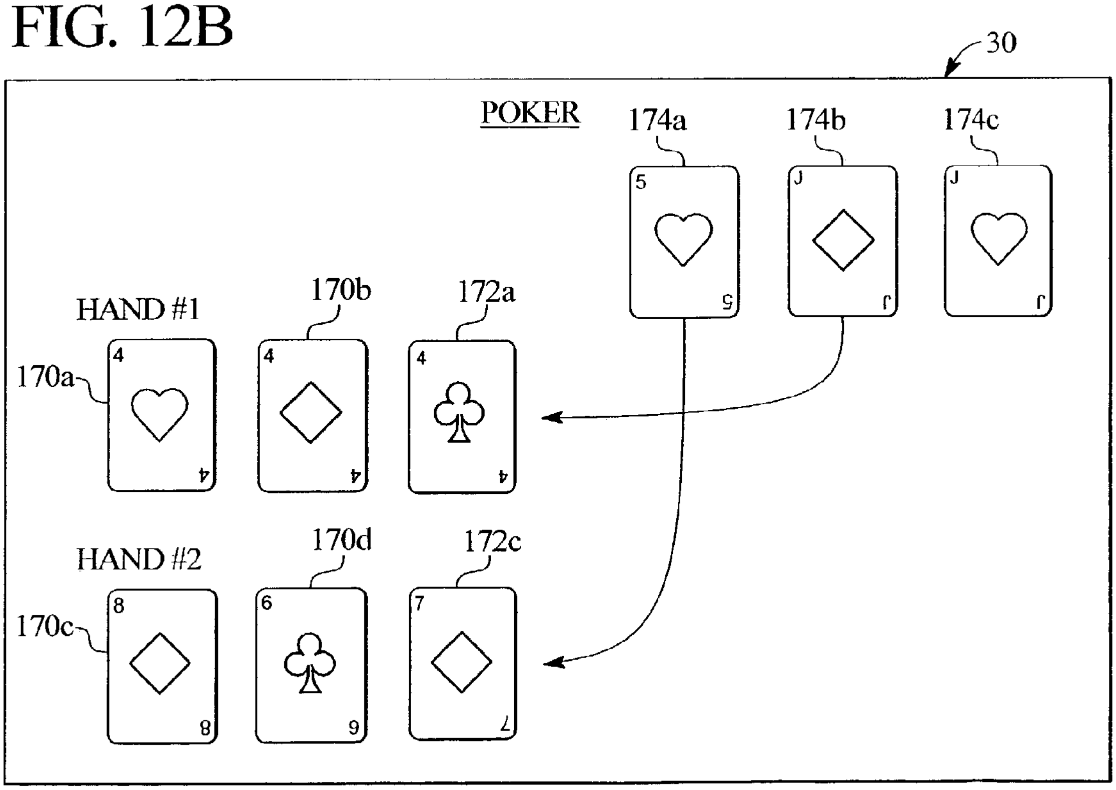
FIG. 12B is a view of the embodiment of the present invention illustrated in FIG. 12A, wherein the processor adds player-selected cards from a second offer set to the player's plurality of hands of cards.

As illustrated in FIG. 12B, the processor 38 determines and offers to the player a second offer set of cards 174*a*, 174*b* and 174*c* from which the player selects cards to be added to each of the player's chosen hands. In this embodiment, the player selects the Jack of Diamonds 174*b* from the second offer set to be added to the cards 170*a*, 170*b* and 172*a* in Hand No. 1. The player selects the Five of Hearts 174*a* from the second offer set to be added to the cards 170*c*, 170*d* and 172*c* in Hand No. 2. The processor 38 adds the player selected cards 174*a* and 174*b* to the player-chosen hands as illustrated in FIG. 12C.

Figure 12C:
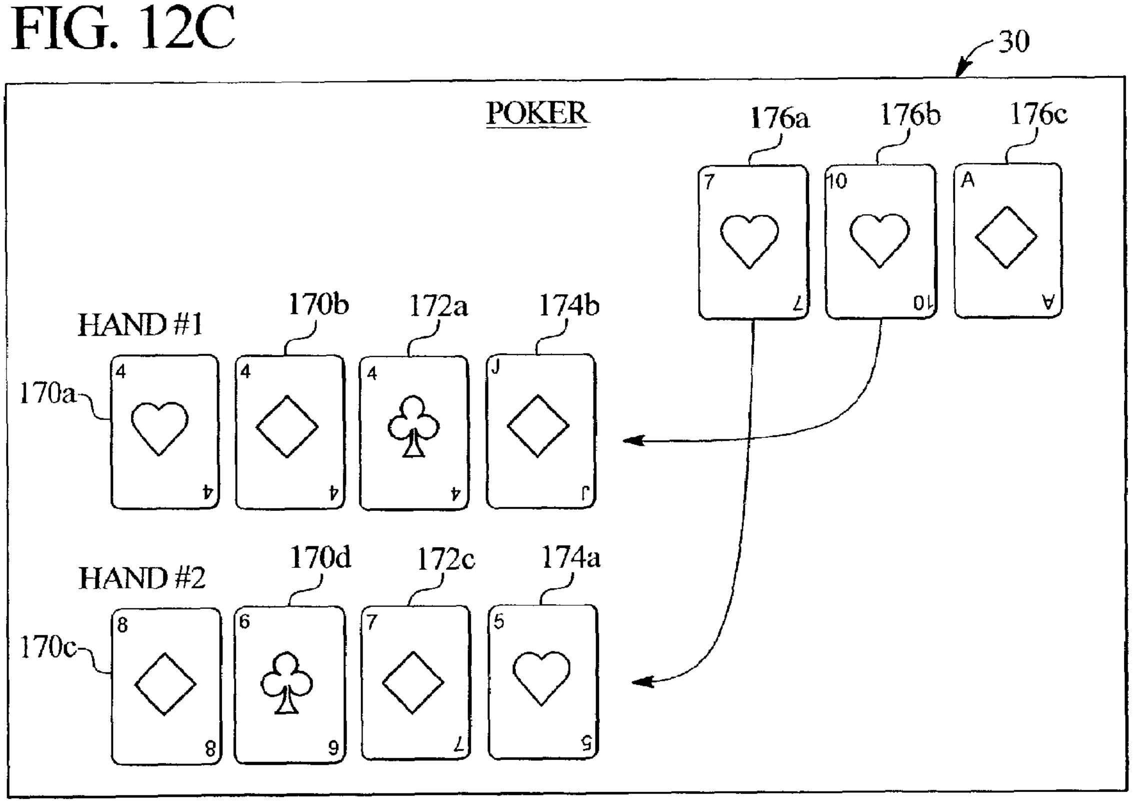
FIG. 12C is a view of the embodiment of the present invention illustrated in FIG. 12A, wherein the processor adds player selected cards from a third offer set to the player's plurality of hands of cards.
Figure 12D:
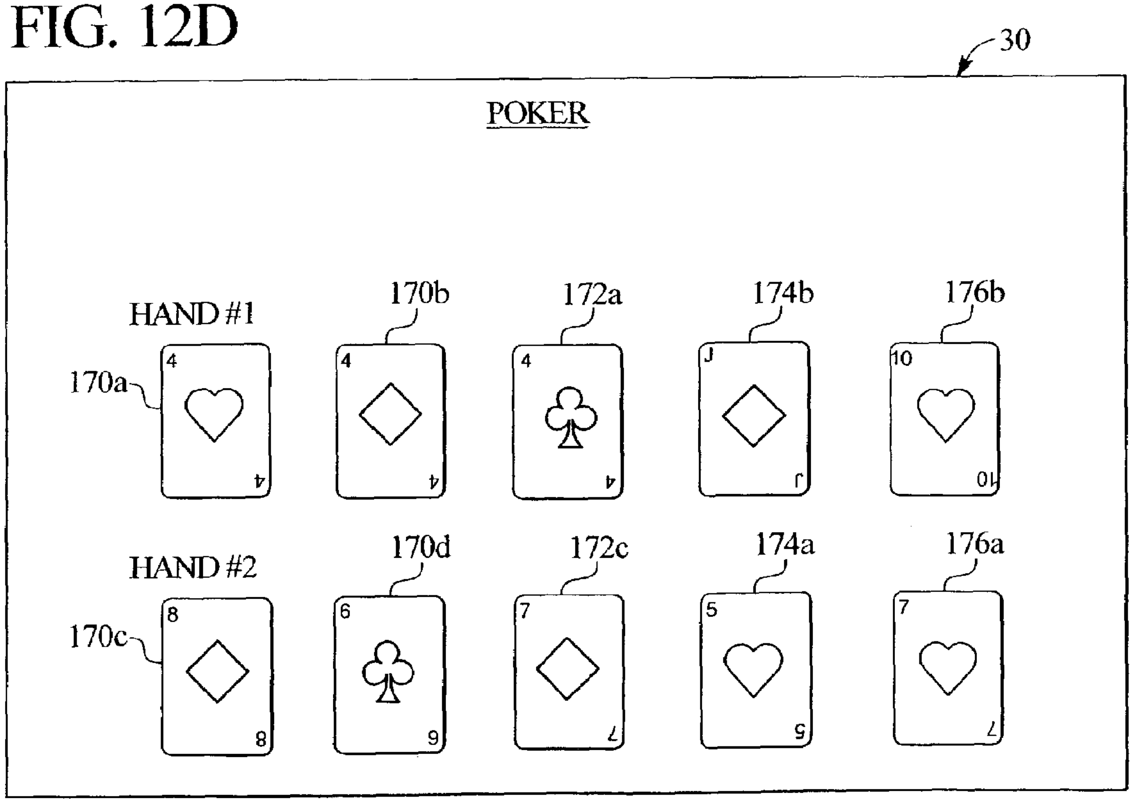
FIG. 12D is a view of the embodiment of the present invention illustrated in FIG. 12A, wherein the processor causes the display of the player's completed plurality of hands.

As illustrated in FIG. 12C, the processor 38 determines and offers a third offer set of cards 176*a*, 176*b* and 176*c* from which the player may select cards to be added to the player's chosen hands. The processor 38 enables the player to select one of the cards 176*a*, 176*b* and 176*c* to be added to each of the player's hands of cards. In this embodiment, the player selects the Ten of Hearts 176*b* to be added to Hand No. 1; The player selects the Seven of Hearts 176*a* to be added to Hand No. 2. The processor 38 causes the display device 30 to display each of the player's complete hands as illustrated in FIG. 12D.

Figure 12E:
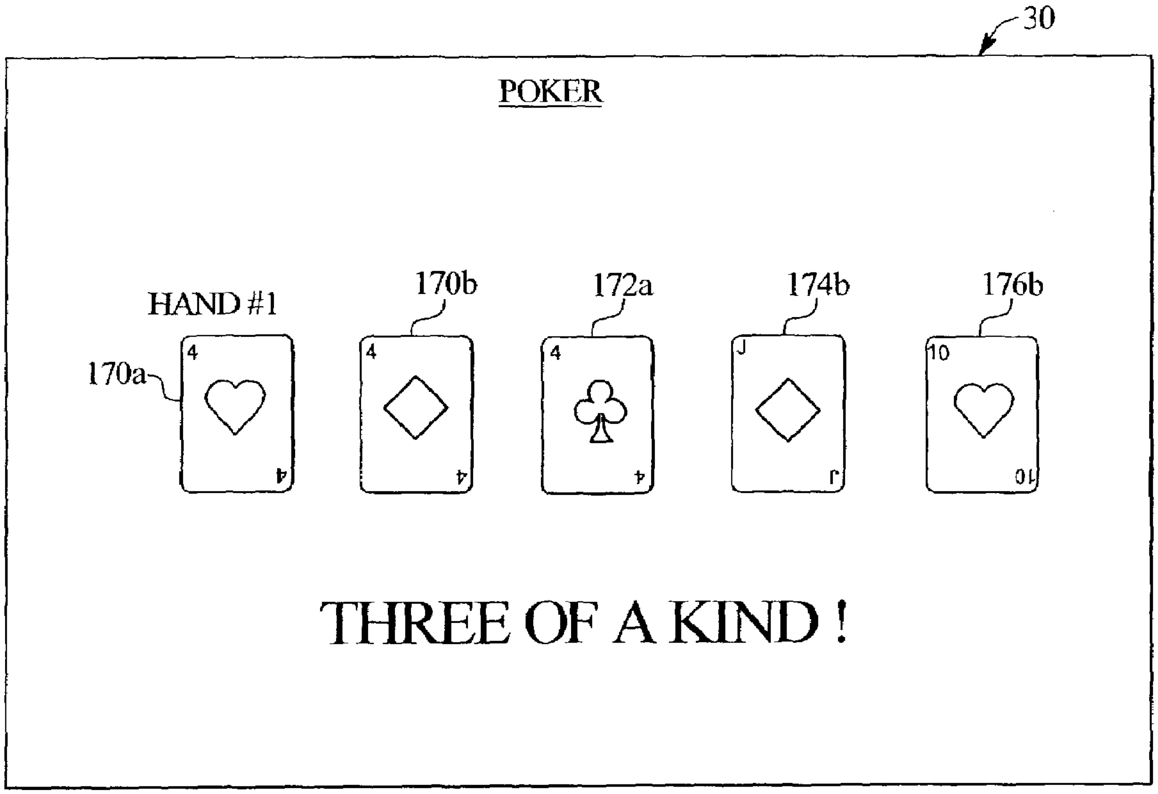
FIG. 12E is a view of the embodiment of the present invention illustrated in FIG. 12A, wherein the processor causes the display of one of the player's completed plurality of hands and indicates that Hand No. 1 forms a Three Of A Kind.

The processor 38 determines if any of the player's hands of cards includes a predetermined winning combination of cards. In this embodiment, the Four of Hearts 170*a*, the Four of Diamonds 170*b*, the Four of Clubs 172*a*, the Jack of Diamonds 174*b* and the Ten of Hearts 176*b* in Hand No. 1 include a Three Of A Kind. The cards, the Eight of Diamonds 170*c*, the Six of Spades 170*d*, the Seven of Diamonds 172*c*, the Five of Hearts 174*a* and the Seven of Hearts 176*a* in Hand No. 2 do not include a winning hand of cards. The processor 38 causes the display device 30 to indicate to the player that Hand No. 1 includes a winning combination of cards as illustrated in FIG. 12E.

As illustrated in the above embodiment, the present invention provides the player with decisions throughout the game. In this embodiment, the player had a decision to either keep the Three Of A Kind and try for a potential Four Of A Kind or try for a potential Straight. The player chose to keep the Three Of A Kind and try for the Four Of A Kind. During the course of the game, the processor 38 offered the player cards which did not include a card to complete the Four Of A Kind. However, the processor 38 did offer the player cards which would have completed the Straight in Hand No. 2 if the player had chosen to place the Four of Clubs 172*a* in Hand No. 2. The player would have realized that if he or she had chosen to place the Four of Clubs 172*a* in Hand No. 2, the player would have received a Straight. The present invention thus provides the player with anticipation and excitement using the plurality of player-selectable symbols.

It should be appreciated that while the above-described embodiments of the present invention involve video poker, video slots and video blackjack, the present invention can include any game played on a gaming device wherein the player is provided with a plurality of symbols.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:
- a plurality of symbols;
- at least one player input device;
- at least one display device; and
- at least one processor programmed to operate with the at least one player input device and the at least one display device to:
- (i) determine at least one first set of the symbols to display to a player;
- (ii) display the first set of the symbols to the player;
- (iii) determine a plurality of offer sets of the symbols, each of said plurality of offer sets including a plurality of, but less than all of the plurality of symbols;
- (iv) simultaneously offer each of the symbols of each of said offer sets of the symbols to the player, wherein each of the symbols of each of said offer sets of the symbols is displayed to the player when offered to the player;
- (v) for at least two of the plurality of offer sets, enable the player to select at least one, but not all, of the symbols from said offer set to add to said first set, wherein if selecting more than one symbol to add to said first set, the player is required to select at least one symbol from at least two different offer sets;
- add the player-selected symbols from said offer sets of the symbols to said first set of the symbols; and
- if the first set of the symbols includes a winning combination of the symbols, provide the player with an award.

2. The gaming device of claim 1, wherein the player selects a plurality of the symbols from at least one of the offer sets to add to the first set of the symbols.

3. The gaming device of claim 1, wherein the player is required to select at least one symbol from at least two of said plurality of offer sets of the symbols to add to said first set of the symbols.

4. The gaming device of claim 1, wherein the at least one processor is programmed to operate with the at least one player input device and the at least one display device to: cause the display of a plurality of sets of the symbols to the player and for each of the plurality of offer sets, enable the player to select at least one symbol from the offer set, select a first set of the symbols to add said selected symbol to, and add the selected symbol to said displayed set chosen by the player.

5. The gaming device of claim 1, wherein the at least one processor is programmed to operate with the at least one player input device and the at least one display device to for at least one of said player selected symbols, enable the player to choose at least one of the symbols in said first set of the symbols to be discarded before adding the player selected symbol to the first set of symbols and add the player-selected symbol from the respective offer set to the first set to replace said discarded symbol.

6. The gaming device of claim 1, wherein the number of said symbols in at least one of said plurality of offer sets is based upon a wager made by the player.

7. The gaming device of claim 1, wherein the at least one processor is programmed to randomly determine the symbols from the plurality of symbols to be included in said first set of the symbols.

8. The gaming device of claim 1, wherein the at least one processor is programmed to randomly determine the symbols from the plurality of symbols to be included in each of said plurality of offer sets.

9. The gaming device of claim 1, wherein the at least one processor is programmed to operate with the at least one player input device and the at least one display device to enable the player to de-select a player-selected symbol from at least one of said plurality of offer sets.

10. The gaming device of claim 1, which includes a set of symbols which is not provided to the player, and wherein the winning combination of the symbols includes a total value for the first set of the symbols, wherein, after the at least one processor causes the player-selected symbol from one of the plurality of offer sets to be added to the first set of the symbols, if the total value of said first set is greater than a total value of the set of the symbols not provided to the player, the at least one processor is programmed to provide the award to the player.

11. The gaming device of claim 10, wherein, the at least one processor is programmed to operate with the at least one display device to reveal at least one symbol included in the set of the symbols not provided to the player before the player selects the symbol from one of said plurality of offer sets.

12. The gaming device of claim 11, wherein the at least one processor is programmed to operate with the at least one display device to reveal the set of the symbols not provided to the player to the player after the at least one processor adds the player-selected symbol from one of the plurality of offer sets to the first set of the symbols.

13. The gaming device of claim 12, wherein the at least one processor is programmed to operate with the at least one display device to add at least one symbol from the plurality of symbols to the set of the symbols not provided to the player.

14. The gaming device of claim 10, wherein the winning combination of symbols includes a winning value.

15. The gaming device of claim 14, wherein said winning value is twenty one.

16. The gaming device of claim 1, wherein the plurality of symbols is associated with a video poker game, a video slot game or a video blackjack game.

17. The gaming device of claim 1, wherein the plurality of symbols are selected from the group consisting of: a value, a gaming card and a gaming symbol.

18. A method of operating a gaming device, the method comprising:

(a) displaying at least one player's set of a plurality of symbols to a player;

(b) displaying a plurality of offer sets of the plurality of symbols each including a plurality of, but less than all of the plurality of symbols to the player;

(c) simultaneously offering each of the symbols of each of the plurality of offer sets of the symbols to the player, wherein each of the symbols of each of said offer sets of the symbols is displayed to the player when offered to the player;

(d) for at least two of the plurality of offer sets, enabling the player to select at least one, but not all, of the symbols from said offer set to add to the player's set of the symbols, wherein if selecting more than one symbol to add to said player's set, the player is required to select at least one symbol from at least two different offer sets;

(e) adding the player-selected symbol from the offer set to the player's set of symbols; and (f) providing the player with an award if the player's set of symbols includes a winning combination of symbols.

19. The method of claim 18, which includes enabling the player to select a plurality of symbols from at least one of the plurality of offer sets.

20. The method of claim 18, which includes displaying a plurality of player's sets of the symbols and for each player's set of the symbols, enabling the player to select an offer set, select at least one symbol from the offer set to add to the player's set of the symbols, and add the selected symbol to the player's set of the symbols.

21. The method of claim 18, which includes, before step (e), enabling the player to choose at least one of the symbols in said player's set of symbols to be discarded, and discarding said player-chosen symbol in the player's set of symbols.

* * * * *